US012591070B2

(12) United States Patent
Osawa et al.

(10) Patent No.: US 12,591,070 B2
(45) Date of Patent: Mar. 31, 2026

(54) DETECTOR AND DETECTION SYSTEM

(71) Applicant: CANON KABUSHIKI KAISHA, Tokyo (JP)

(72) Inventors: Kazutaka Osawa, Kanagawa (JP); Takanori Watanabe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 197 days.

(21) Appl. No.: 18/625,584

(22) Filed: Apr. 3, 2024

(65) Prior Publication Data

US 2024/0361475 A1 Oct. 31, 2024

(30) Foreign Application Priority Data

Apr. 28, 2023 (JP) ................................. 2023-074419

(51) Int. Cl.
*G01T 1/20* (2006.01)
(52) U.S. Cl.
CPC ................................. *G01T 1/20182* (2020.05)
(58) Field of Classification Search
CPC ................................................. G01T 1/20182
See application file for complete search history.

(56) References Cited

U.S. PATENT DOCUMENTS

| | | | |
|---|---|---|---|
| 2015/0029376 A1 | 1/2015 | Sugawa | |
| 2019/0043913 A1* | 2/2019 | Juen ..................... | H10F 39/8037 |
| 2020/0213541 A1 | 7/2020 | Kobayashi | |
| 2024/0073549 A1 | 2/2024 | Mizutani | |

FOREIGN PATENT DOCUMENTS

JP 2006-253498 A 9/2006

* cited by examiner

*Primary Examiner* — David J Makiya
*Assistant Examiner* — Mamadou Faye
(74) *Attorney, Agent, or Firm* — VENABLE LLP

(57) ABSTRACT

A detector includes a plurality of first pixels, a signal wiring group, a first wiring, and a control portion. The plurality of first pixels are arranged in a column direction. The signal wiring group is disposed in a first wiring layer. The signal wiring group includes a plurality of signal wirings adjacent to each other. Signals are respectively outputted from the plurality of first pixels to the plurality of signal wirings. The first wiring is disposed in the first wiring layer and adjacent to the signal wiring group. The control portion is configured to control potential of the first wiring such that the potential of the first wiring follows potential of a signal transmitted through the signal wiring group.

14 Claims, 13 Drawing Sheets

FIG.4

DETECTOR AND DETECTION SYSTEM

BACKGROUND

Field

The present disclosure relates to a detector and a detection system.

Description of the Related Art

The detector includes a plurality of pixels arranged in a matrix. Each pixel includes a detection diode that converts energy to electric charge. From each pixel, a signal is read via a signal wiring. Japanese Patent Application Publication No. 2006-253498 discloses a configuration in which a wiring that is set at a ground potential or a power supply potential is disposed adjacent to a signal wiring.

When signals are read from a pixel column, the signals are outputted simultaneously from a plurality of pixels included in the pixel column, to a plurality of signal wirings. The electric potential outputted from each of the plurality of pixels when a reset operation is performed on the pixel is different from the electric potential outputted from the pixel when electric charge is transferred from the detection diode of the pixel. Thus, the parasitic capacitance between the signal wiring and the wiring produced when the electric charge is read changes from the parasitic capacitance between the signal wiring and the wiring produced in the reset operation. As a result, the reading speed of the signal transmitted through the signal wiring is limited by the parasitic capacitance.

SUMMARY

The present disclosure increases the reading speed of the signal transmitted through each of the plurality of signal wirings disposed adjacent to each other.

According to one aspect of the present invention, a detector includes a plurality of first pixels, a signal wiring group, a first wiring, and a control portion. The plurality of first pixels are arranged in a column direction. The signal wiring group is disposed in a first wiring layer. The signal wiring group includes a plurality of signal wirings adjacent to each other. Signals are respectively outputted from the plurality of first pixels to the plurality of signal wirings. The first wiring is disposed in the first wiring layer and adjacent to the signal wiring group. The control portion is configured to control potential of the first wiring such that the potential of the first wiring follows potential of a signal transmitted through the signal wiring group.

Further features of the present invention will become apparent from the following description of exemplary embodiments with reference to the attached drawings.

BRIEF DESCRIPTION OF THE DRAWINGS

FIG. 4 is a cross-sectional view illustrating a cross section taken along a line A-A' of FIG. 3C.

DESCRIPTION OF THE EMBODIMENTS

Figure 1:
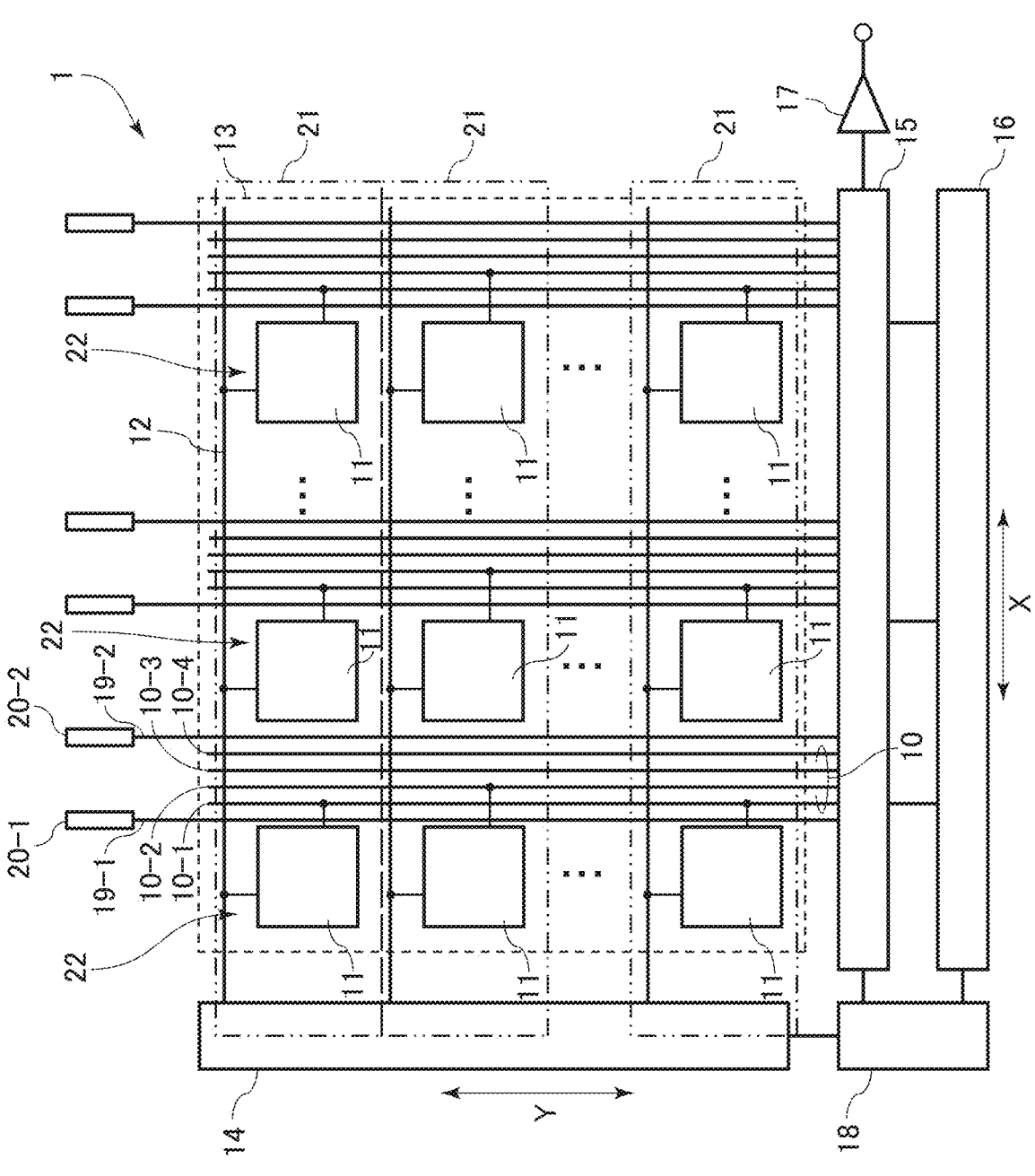
FIG. 1 is a block diagram illustrating a schematic configuration of an image pickup apparatus that is one example of a detector of a first embodiment.

Hereinafter, some embodiments of the present disclosure will be described with reference to the accompanying drawings. In the drawings, an identical component is given an identical symbol.

Examples of the detector of the present disclosure include a photodetector that detects light, such as visible light or infrared light, and a radiation detector that detects radiation. The radiation detected by the radiation detector may be ionizing radiation, such as X rays or gamma rays, or particle rays, such as alpha rays, beta rays, neutron beam, proton beam, electron beam, heavy ion beam, or meson beam. In the present disclosure, the radiation, such as the ionizing radiation or particle rays and the light (i.e., electromagnetic waves other than the ionizing radiation), which are detected by the detector, are collectively called energy rays.

In addition, in the below-described embodiments, the description will be made for a case where electrons are used as signal charge. In another case, however, holes may be used as the signal charge. In this case, a P-type semiconductor region is replaced with an N-type semiconductor region, and an N-type semiconductor region is replaced with a P-type semiconductor region.

First Embodiment

FIG. 1 is a block diagram illustrating a schematic configuration of an image pickup apparatus 1 that is one example of a detector of a first embodiment. The image pickup apparatus 1 includes a pixel array 13, a vertical scanning circuit 14, a column-circuit portion 15, a horizontal scanning circuit 16, an output circuit 17, and a control circuit 18. In FIG. 1, an X direction is equal to a row direction, and a Y direction is equal to a column direction. The X direction and the Y direction are orthogonal to each other.

The pixel array 13 includes a plurality of pixels 11 arranged in a two-dimensional matrix. The pixel 11 is one example of a first pixel. Each pixel column 22 of the pixel array 13 is provided with a signal wiring group 10. The signal wiring group 10 includes a plurality of signal wirings connected to the column-circuit portion 15 and extending in the Y direction. In the first embodiment, the signal wiring group 10 includes four signal wirings 10-1 to 10-4 disposed adjacent to each other. The four signal wirings 10-1 to 10-4 are spaced from each other in the X direction.

Each pixel row 21 of the pixel array 13 is connected to the vertical scanning circuit 14 via a control line 12 that extends in the X direction. Note that in FIG. 1, the control line 12 connected to each pixel 11 is illustrated as a single wiring. However, the control line 12 is constituted by a plurality of wirings used for outputting a plurality of below-described signals to the pixel 11.

Each pixel column 22 of the pixel array 13 includes a plurality of pixels 11 arranged in the Y direction. For example, each pixel column 22 of the pixel array 13 includes four or more pixels 11. In addition, four pixels 11 of the pixel column 22 are simultaneously selected by the vertical scanning circuit 14, and signals are respectively outputted from the four pixels 11 to the four signal wirings 10-1 to 10-4.

The vertical scanning circuit 14 controls the accumulating period of signal charge of the pixel 11. Note that the pixels 11 are cells whose equivalent circuits are equal to each other. However, physical layouts of the pixels 11 may be partly different from each other, depending on the signal wirings connected to the pixels 11. In the first embodiment, the description will be made, as an example, for the case where the four signal wirings 10-1 to 10-4 are disposed for a single pixel column 22. However, the number of the signal wirings is not limited to four, and has only to be two or more.

The column-circuit portion 15 includes a plurality of column circuits. The signal wirings 10-1 to 10-4 are connected to corresponding ones of the plurality of column circuits included in the column-circuit portion 15. Each column circuit receives an analog signal from a corresponding signal wiring, produces a digital signal by processing the analog signal, and outputs the digital signal to the outside of the image pickup apparatus 1 via the output circuit 17. For example, this process includes an AD conversion process and an amplification process.

The horizontal scanning circuit 16 sequentially selects the plurality of column circuits included in the column-circuit portion 15. With this operation, signals held by the plurality of column circuits are sequentially outputted to the output circuit 17. The output circuit 17 outputs the signals to the outside of the image pickup apparatus 1. The signals outputted by the output circuit 17 are signals that the image pickup apparatus 1 output to the outside. Each of the signals outputted by the output circuit 17 is a digital signal obtained by the column circuit performing the correlated double sampling. For example, the digital signal is a pixel signal.

The control circuit 18 is connected to each of the vertical scanning circuit 14, the column-circuit portion 15, and the horizontal scanning circuit 16, via a driving line that supplies a driving signal. For example, the control circuit 18 includes a timing generator and a phase locked loop (PLL).

The image pickup apparatus 1 includes potential control circuits 20-1 and 20-2 that are one example of a control portion, a wiring 19-1 whose electric potential is controlled by the potential control circuit 20-1, and a wiring 19-2 whose electric potential is controlled by the potential control circuit 20-2. The wirings 19-1 and 19-2 are connected to the column-circuit portion 15.

In the first embodiment, the potential control circuits 20-1 and 20-2 operate in synchronization with each other. Each of the wirings 19-1 and 19-2 is one example of a first wiring.

Each of the wirings 19-1 and 19-2 is a dummy wiring that is not used in the generation of the signal outputted from the output circuit 17. That is, the electric potential of each of the wirings 19-1 and 19-2 is not used in the generation of the pixel signal outputted from the output circuit 17. For example, although the wirings 19-1 and 19-2 are connected to the column-circuit portion 15, the column-circuit portion 15 may not produce digital signals based on the electric potentials of the wirings 19-1 and 19-2. Even if the digital signals are produced, the digital signals are dummy signals, and are not used for the pixel signal. Note that since the wirings 19-1 and 19-2 have only to have electric potentials controlled by the potential control circuits 20-1 and 20-2, the wirings 19-1 and 19-2 may not be connected to the column-circuit portion 15.

Figure 2:
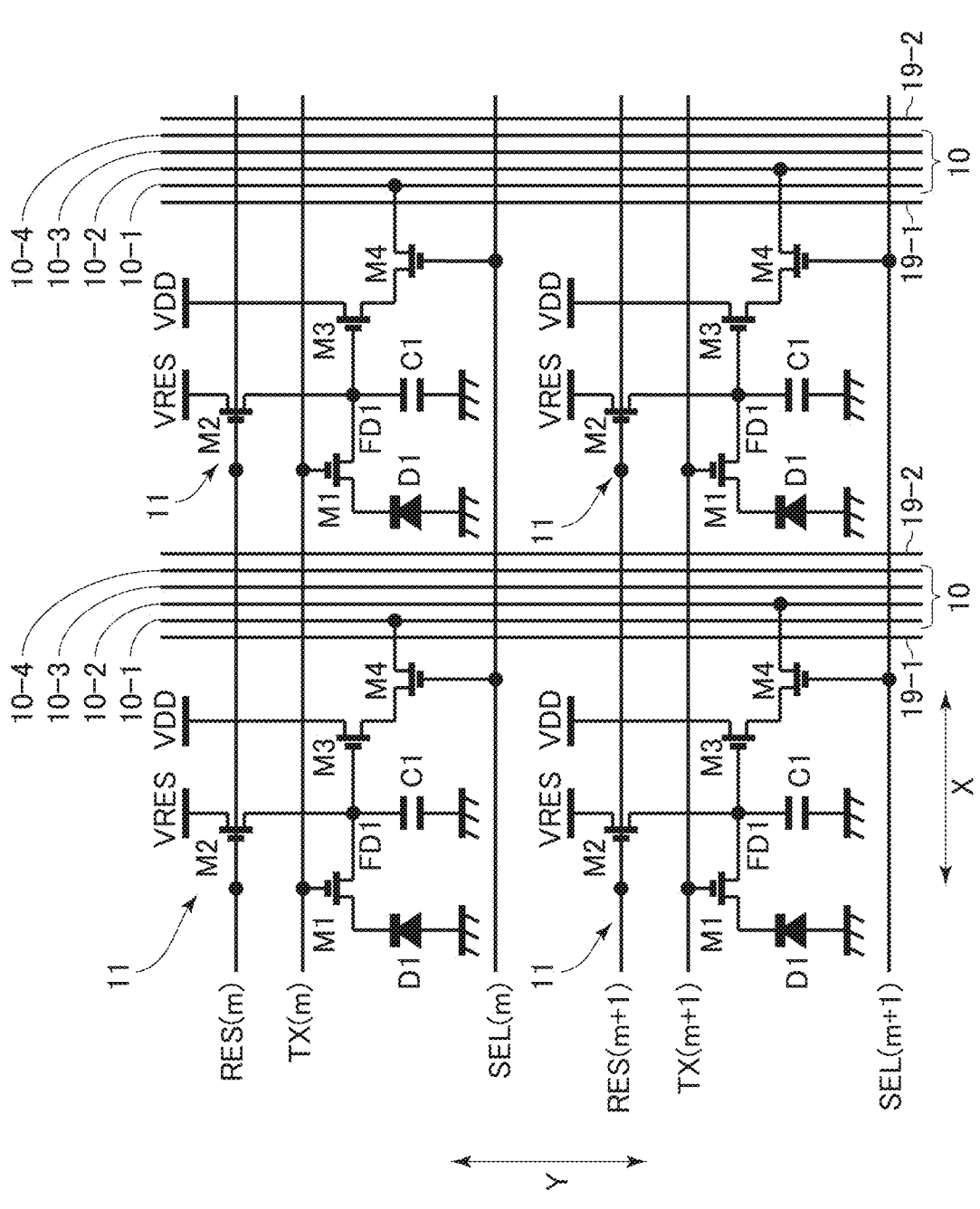
FIG. 2 is an equivalent circuit diagram of a pixel of the first embodiment.

FIG. 2 is an equivalent circuit diagram of the pixel 11 of the first embodiment. FIG. 2 illustrates circuits of pixels 11 in two rows and two columns (the pixels 11 are included in the pixel array 13 illustrated in FIG. 1). Since the four pixels 11 illustrated in FIG. 2 have an identical configuration, a single pixel 11 connected to the signal wiring 10-1 will be described. The pixel 11 includes a detection diode D1, a transfer transistor M1, a reset transistor M2, an amplification transistor M3, a selection transistor M4, and a floating diffusion FD1. In addition, a charge conversion portion C1 is formed between the floating diffusion FD1 and the ground. The detection diode D1 is one example of a first conversion portion. The transfer transistor M1 is one example of a first transfer transistor. The reset transistor M2 is one example of a first reset transistor. The amplification transistor M3 is one example of a first amplification transistor. The selection transistor M4 is one example of a first selection transistor. The floating diffusion FD1 is one example of a first floating diffusion.

The detection diode D1 converts energy rays incident on the detection diode D1, to electric charge; and accumulates the electric charge. The electric charge accumulated in the detection diode D1 is electrons. All the transistors M1 to M4 included in the pixel 11 are N-type transistors. Note that the electric charge accumulated in the detection diode D1 may be holes. In this case, all the transistors M1 to M4 included in the pixel 11 are P-type transistors. That is, the definition of the below-described conductivity type may be changed in accordance with the polarity of electric charge used as signals.

The transfer transistor M1 is disposed in an electrical path between the detection diode D1 and the floating diffusion FD1. The floating diffusion FD1 is a node at which the reset transistor M2 and the amplification transistor M3 are connected with each other. The electric charge transferred from the detection diode D1 is held by the floating diffusion FD1, due to the capacitance of the charge conversion portion C1.

The drain of the reset transistor M2 is applied with a reset voltage VRES, and the drain of the amplification transistor M3 is applied with a power supply voltage VDD. The selection transistor M4 is disposed in an electrical path between the amplification transistor M3 and the signal wiring 10-1. The amplification transistor M3 is electrically connected to the signal wiring 10-1 via the selection transistor M4. The charge conversion portion C1 has a capacitance of the floating diffusion FD1, and a parasitic capacitance of the electrical path that extends from the transfer transistor M1 to the amplification transistor M3 via the floating diffusion FD1.

Each of a signal RES, a signal TX, and a signal SEL is a signal supplied from the vertical scanning circuit 14 via the control line 12 illustrated in FIG. 1. In FIG. 2, the symbol of each of the signal RES, the signal TX, and the signal SEL is added with a symbol that is put in parentheses, and that represents a pixel row to which the signal is supplied. For example, a signal RES(m) is a signal RES supplied to pixels 11 in the m-th row. The parameter m is an integer equal to or larger than 1.

The signal wiring 10-1 is connected with a current source (not illustrated). If the level of the signal SEL(m) becomes an active level, the selection transistor M4 of the pixel 11 in the m-th row turns ON. As a result, current is supplied from the current source (not illustrated) to the amplification transistor M3 of the pixel 11 in the m-th row. In the pixel 11 in the m-th row, a source follower circuit is formed by the power supply voltage VDD, the amplification transistor M3, and the current source (not illustrated) connected to the signal wiring 10-1. Since the source follower circuit is formed, the amplification transistor M3 outputs a signal based on the electric potential of the floating diffusion FD1, or a signal based on the electric charge held by the charge conversion portion C1, to the signal wiring 10-1 via the selection transistor M4.

In addition, if the level of the signal SEL(m+1) becomes an active level, the selection transistor M4 in the(m+1)th row turns ON. As a result, current is supplied from a current source (not illustrated) to the amplification transistor M3 in the(m+1)th row. In the pixel 11 in the (m+1)th row, a source follower circuit is formed by the power supply voltage VDD, the amplification transistor M3, and the current source (not illustrated) connected to the signal wiring 10-2. Since the source follower circuit is formed, the amplification transistor M3 outputs a signal based on the electric potential of the floating diffusion FD1, or a signal based on the electric charge held by the charge conversion portion C1, to the signal wiring 10-2 via the selection transistor M4.

Note that although not illustrated, the pixel 11 in the(m+2)th row is connected to the signal wiring 10-3, and operates like the pixel 11 in the m-th row. In addition, the pixel 11 in the (m+3)th row is connected to the signal wiring 10-4, and operates like the pixel 11 in the m-th row.

In the first embodiment, four pixels 11 in the m-th to the(m+3)th rows, included in a single pixel column 22, are driven in synchronization with each other, and signals from the four pixels 11 are outputted to the four signal wirings 10-1 to 10-4 in synchronization with each other. Like the four pixels 11 in the m-th to the(m+3)th rows, pixels 11 in the(m+4)th to the(m+7)th rows are also connected to the signal wirings 10-1 to 10-4. After the signals from the four pixels 11 in the m-th to the(m+3)th rows are read, signals from four pixels 11 in the(m+4)th to the (m+7)th rows are read in synchronization with each other.

The potential control circuit 20-1 is connected with the wiring 19-1, and the potential control circuit 20-2 is connected with the wiring 19-2. The potential control circuit 20-1 controls the timing at which the potential control circuit 20-1 changes the electric potential of the wiring 19-1, depending on the operation of the signal RES, the signal TX, and the signal SEL. The potential control circuit 20-2 controls the timing at which the potential control circuit 20-2 changes the electric potential of the wiring 19-2, depending on the operation of the signal RES, the signal TX, and the signal SEL. In the first embodiment, the potential control circuit 20-2 controls the electric potential of the wiring 19-2, in synchronization with the control performed by the potential control circuit 20-1. In the first embodiment, each of the potential control circuits 20-1 and 20-2 is a voltage source.

Figure 3:
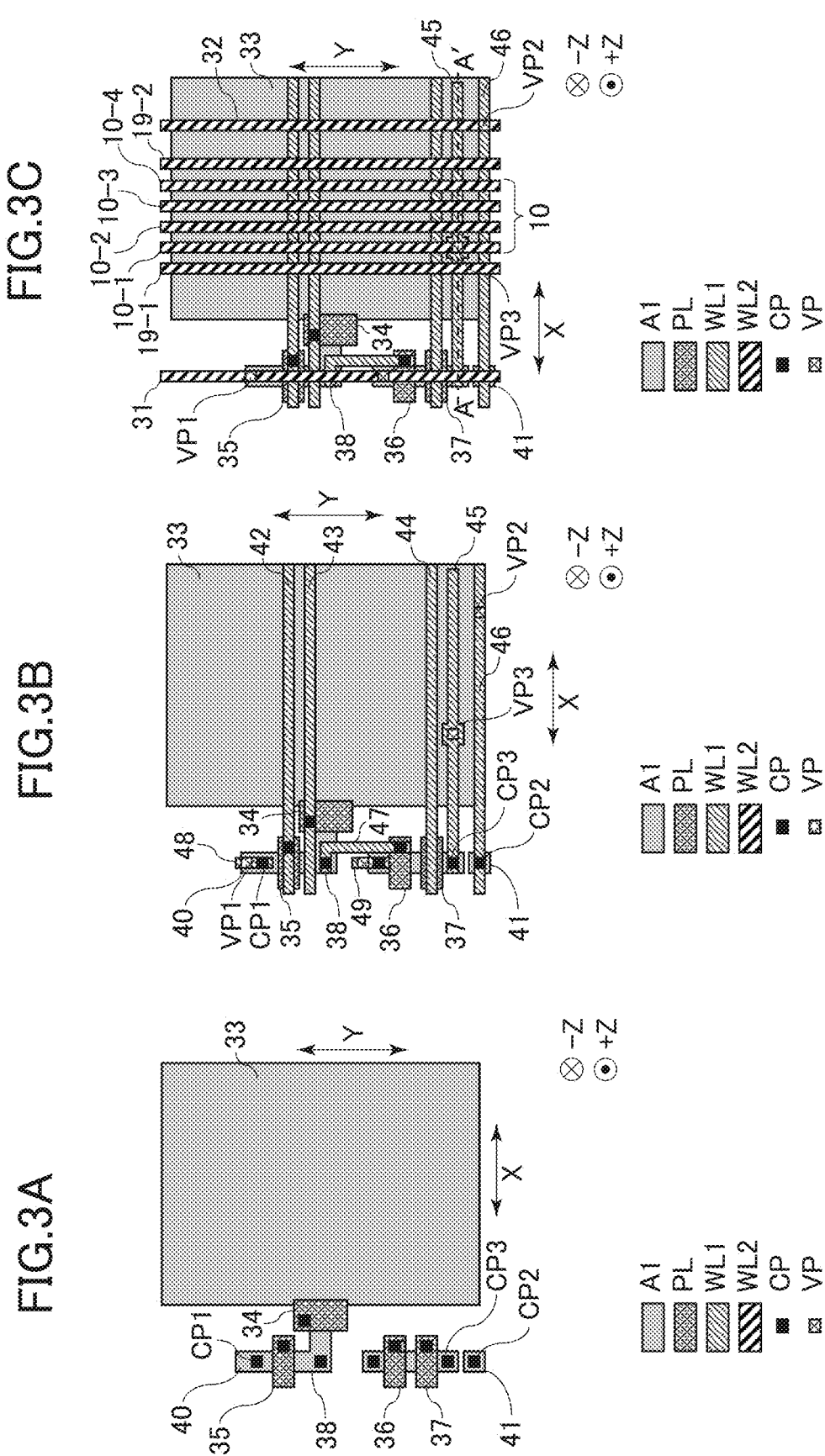
FIG. 3A is a plan view illustrating a layout of the pixel of the first embodiment.
FIG. 3B is a plan view illustrating a layout of the pixel of the first embodiment.
FIG. 3C is a plan view illustrating a layout of the pixel of the first embodiment.
Figure 4:
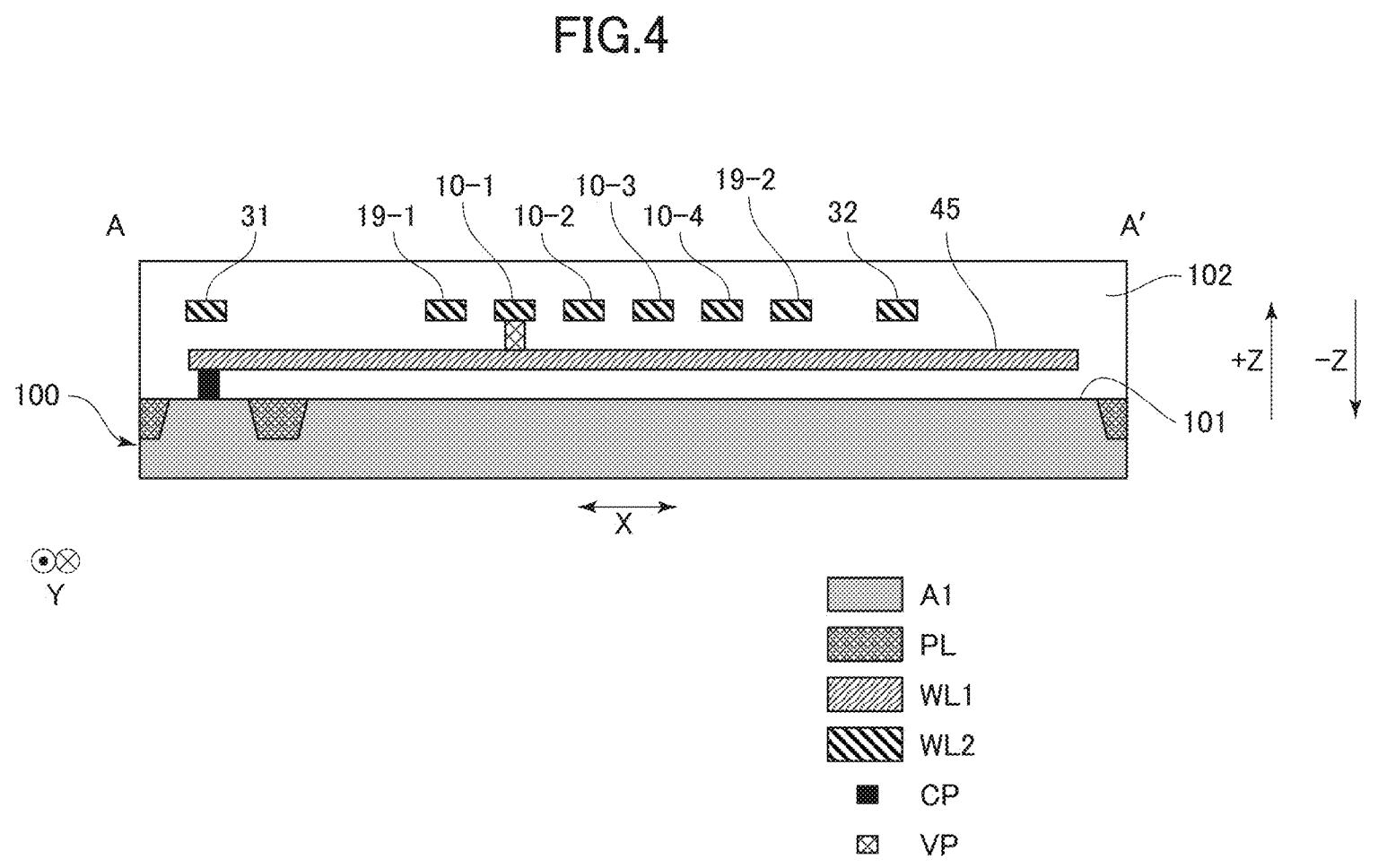

Each of FIGS. 3A to 3C is a plan view illustrating a layout of the pixel 11 of the first embodiment. FIG. 4 is a cross-sectional view illustrating a cross section taken along a line A-A' of FIG. 3C. In FIGS. 3A to 3C and 4, an active region A1, a polysilicon layer PL, a wiring layer WL1, a wiring layer WL2, a contact plug CP, and a via plug VP are illustrated with hatch patterns different from each other. The wiring layer WL2 is one example of a first wiring layer. The wiring layer WL1 is one example of a second wiring layer different from the wiring layer WL2.

The active region A1 is a surface 101 of a semiconductor substrate 100 that is a semiconductor layer. In the active region A1, semiconductor elements, such as the detection diode D1 and the transistors M1 to M4, are formed. That is, the semiconductor elements of each pixel 11 of the pixel array 13 are formed in the surface 101 of the semiconductor substrate 100. The surface 101 is one example of a main surface. A portion of the surface 101 of the semiconductor substrate 100 other than the active region A1 may be an element isolation region. The element isolation region may have a structure that includes an insulator, such as a shallow trench isolation (STI), or may have a PN separation structure in which the conductivity type of the semiconductor is utilized. When seen through the image pickup apparatus 1 in a −Z direction, the potential control circuits 20-1 and 20-2 illustrated in FIG. 1 are disposed at positions at which the potential control circuits 20-1 and 20-2 do not overlap with the pixels 11 of the pixel array 13.

The polysilicon layer PL may be formed in the surface 101 of the semiconductor substrate 100. For example, the polysilicon layer PL serves as the gate electrodes of the transistors M1 to M4. However, the polysilicon layer PL may not be made of polysilicon, and may be made of another metal.

Each of the wiring layers WL1 and WL2 is made of a conductor, and is disposed on the surface 101 side of the semiconductor substrate 100. The wiring layer WL1 and the wiring layer WL2 are disposed in this order in a +Z direction extending away from the surface 101 of the semiconductor substrate 100. That is, the wiring layer WL1 and the wiring layer WL2 are spaced from each other in the +Z direction. Note that the energy rays are incident on the pixel in the −Z direction opposite to the +Z direction. The +Z direction and the −Z direction are orthogonal to the X direction and the Y direction. That is, the +Z direction and the −Z direction are directions orthogonal to the surface 101.

On the surface 101 of the semiconductor substrate 100, an insulation member 102 that is an insulation layer is disposed. The insulation member 102 includes an inter-layer insulation film formed between the semiconductor substrate 100 and the wiring layer WL1, and an inter-layer insulation film formed between the wiring layer WL1 and the wiring layer WL2.

The contact plug CP is made of a conductor, and electrically connects the semiconductor substrate 100 and the wiring layer WL1, and the polysilicon layer PL and the wiring layer WL1. The via plug VP is made of a conductor, and electrically connects the wiring layer WL1 and the wiring layer WL2.

The energy rays emitted toward the image pickup apparatus 1 passes through the insulation member 102, which is an insulation layer, and the wiring layers WL2 and WL1, and reaches the detection diode D1 formed in the surface 101 of the semiconductor substrate 100. In this manner, an image is captured by the image pickup apparatus 1. Note that the wiring structure is not limited to the above-described structure. For example, a third wiring layer may be disposed between the wiring layer WL1 and the wiring layer WL2.

FIG. 3A is a plan view of the active region A1, the polysilicon layer PL, and the contact plug CP. FIG. 3B is a plan view of a structure in which the wiring layer WL1 and the via plug VP are added to the structure illustrated in FIG. 3A. The contact plug CP is disposed between the semiconductor substrate 100 and the wiring layer WL1. In FIG. 3B, however, the contact plug CP is illustrated on the wiring layer WL1 for convenience of description and for ease of understanding. FIG. 3C is a plan view of a structure in which the wiring layer WL2 is added to the structure illustrated in FIG. 3B. In FIG. 3C, the via plug VP is illustrated on the wiring layer WL2 for convenience of description and for ease of understanding.

In FIG. 3A, the active region A1 includes a region 33, a charge conversion portion 38, and a region 40. The polysilicon layer PL includes gate electrodes 34 to 37. The region 33 is a region in which the detection diode D1 is disposed. The transfer transistor M1 includes the gate electrode 34, the region 33, and the charge conversion portion 38. The charge conversion portion 38 is the charge conversion portion C1 illustrated in FIG. 2. The reset transistor M2 includes the charge conversion portion 38, the gate electrode 35, and the region 40. The gate electrode 36 is the gate electrode of the amplification transistor M3, and the gate electrode 37 is the gate electrode of the selection transistor M4. A region 41 is a region for supplying electric potential to a well. The well is a semiconductor region in which each element is formed. For example, in a case where the signal charge is electrons and the transistors are N-type transistors, the well is a P-type semiconductor region. Note that in the first embodiment, the area for the detection diode is defined by the active region A1. However, the area for the detection diode may be defined by a semiconductor region that has the same conductivity type as that of the well of the transistors in which the PN separation is utilized.

As illustrated in FIG. 3B, the wiring layer WL1 includes a plurality of wirings 42 to 49. The wiring 42 is a wiring for supplying a control signal to the gate electrode 35. The wiring 43 is a wiring for supplying a control signal to the gate electrode 34. The wiring 44 is a wiring for supplying a control signal to the gate electrode 37. The wiring 45 is a signal output line that is electrically connected to the source/drain region of the selection transistor M4. The wiring 46 is a wiring for supplying a voltage to the well. For example, if the signal charge is electrons, the voltage supplied by the wiring 46 is the ground (GND). The wiring 47 is a wiring that electrically connects the charge conversion portion 38 and the gate electrode 36. The capacitance component of the charge conversion portion C1 is formed by the wiring 47, the charge conversion portion 38, and the gate electrode 36. The wiring 48 is a wiring for supplying a voltage to the region 40. For example, if the signal charge is electrons, the voltage supplied via the wiring 48 is the power supply voltage VDD. The wiring 49 is a wiring for supplying a voltage to the region 40. For example, if the signal charge is electrons, the voltage supplied via the wiring 49 is the power supply voltage VDD. The wirings 42 to 46 are global wirings that are disposed for and shared by the plurality of pixels 11. The longitudinal direction of the wirings 42 to 46 is the X direction.

As illustrated in FIG. 3C, the wiring layer WL2 includes a plurality of wirings 31, 32, 10-1 to 10-4, 19-1, and 19-2, which extend in the Y direction. The plurality of wirings 31, 32, 10-1 to 10-4, 19-1, and 19-2 are spaced from each other in the X direction. The wiring 31 is electrically connected with the source/drain region of the amplification transistor M3 via a via plug VP1, the wiring 48, and a contact plug CP1. The wiring 31 is a power supply wiring that is set at the power supply potential. In addition, the wiring 32 is a ground wiring that is set at the ground potential. Each of the wirings 31 and 32 is one example of a second wiring.

The source/drain region of the amplification transistor M3 is supplied with the power supply potential via the wiring 31. The wiring 32 is electrically connected to the region 41 via a via plug VP2, the wiring 46, and a contact plug CP2. The region 41 is supplied with the ground potential via the wiring 32. The signal wirings 10-1 to 10-4 are vertical output lines. The signal wiring 10-1 is electrically connected to the source/drain region of the selection transistor M4 via a via plug VP3, the wiring 45, and a contact plug CP3. The signal outputted from the selection transistor M4 is outputted to the signal wiring 10-1.

As illustrated in FIGS. 3C and 4, the four signal wirings 10-1 to 10-4 of the signal wiring group 10 are disposed adjacent to each other in the wiring layer WL2. Each of the wirings 19-1 and 19-2 is disposed adjacent to the signal wiring group 10 in the wiring layer WL2. Specifically, the wiring 19-1 is disposed adjacent to the signal wiring 10-1 of the signal wiring group 10 in the wiring layer WL2, and the wiring 19-2 is disposed adjacent to the signal wiring 10-4 of the signal wiring group 10 in the wiring layer WL2. In other words, the wiring 19-1 is disposed closest to the signal wiring 10-1 among the signal wirings 10-1 to 10-4. In addition, the wiring 19-2 is disposed closest to the signal wiring 10-4 among the signal wirings 10-1 to 10-4. Thus, the two wirings 19-1 and 19-2 are disposed such that the signal wiring group 10 (i.e., the signal wirings 10-1 to 10-4) are interposed between the two wirings 19-1 and 19-2. In addition, the two wirings 31 and 32 are disposed such that the wirings, 19-1 and 19-2, and the signal wiring group 10 (i.e., the signal wirings 10-1 to 10-4) are interposed between the two wirings 31 and 32. The longitudinal direction of the wirings 31, 32, 10-1 to 10-4, 19-1, and 19-2 is the Y direction. Preferably, the distance between the signal wiring 10-1 and the wiring 19-1 and the distance between the signal wiring 10-4 and the wiring 19-2 are almost equal to the distance between two adjacent ones of the signal wirings 10-1 to 10-4.

The wiring 19-1 is disposed between the signal wiring 10-1 of the signal wiring group 10 and the wiring 31. The wiring 19-2 is disposed between the signal wiring 10-4 of the signal wiring group 10 and the wiring 32. Note that in the first embodiment, each of the two wirings 19-1 and 19-2 is the first wiring. However, one of the two wirings 19-1 and 19-2 may not be disposed.

Figure 5:
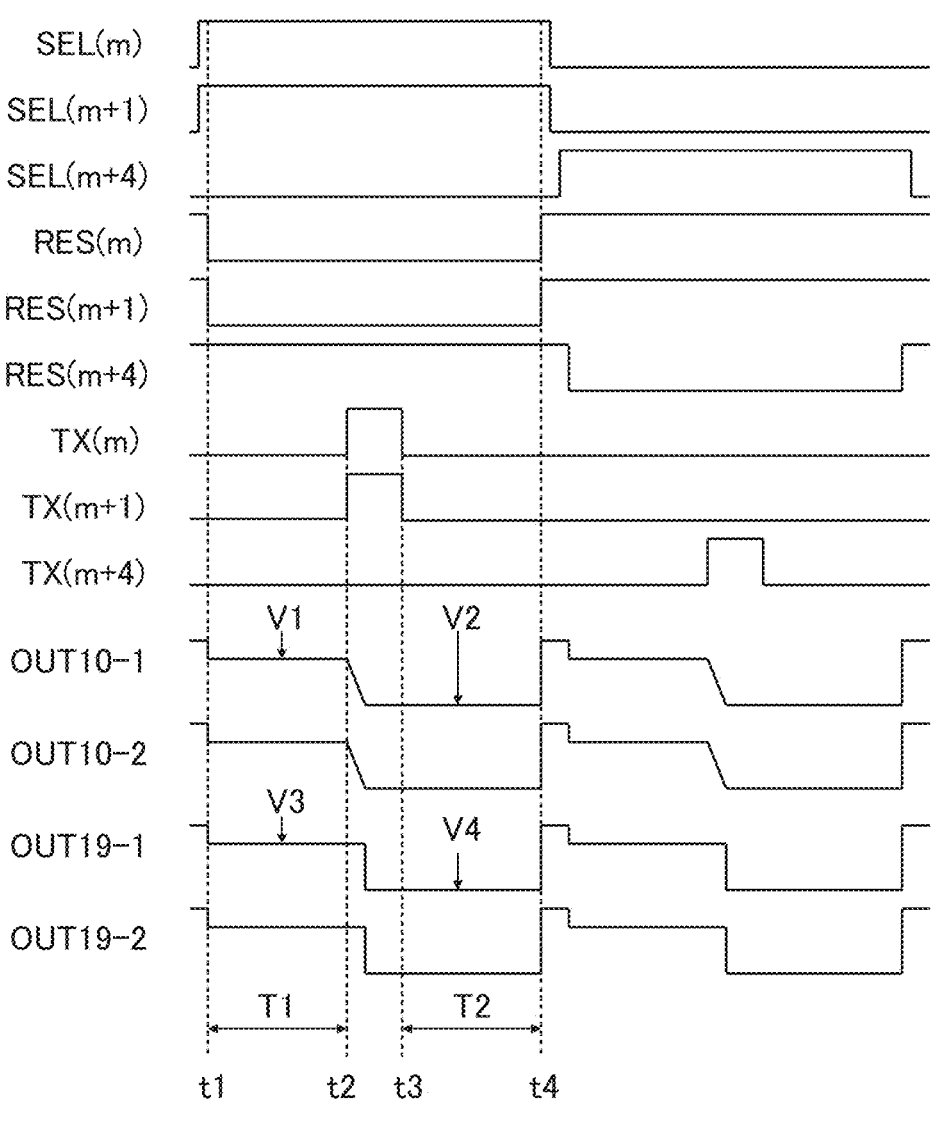
FIG. 5 is a timing chart illustrating one example of timings for driving the image pickup apparatus of the first embodiment.

FIG. 5 is a timing chart illustrating one example of timings for driving the image pickup apparatus 1 of the first embodiment. In the first embodiment, four pixel rows 21 are driven in synchronization with each other. In a single pixel column 22, four pixels 11 included in the pixel column 22 are driven in synchronization with each other. Thus, four signals are outputted in synchronization with each other, from the four pixels 11 to the four signal wirings 10-1 to 10-4. Hereinafter, two of the four pixels 11 that correspond to the signal wirings 10-1 and 10-2 will be described.

A signal SEL(m) and a signal SEL(m+1) are outputted in synchronization with each other. A signal RES(m) and a signal RES(m+1) are outputted in synchronization with each other. A signal TX(m) and a signal TX(m+1) are outputted in synchronization with each other.

A symbol OUT10-1 represents a signal for the signal wiring 10-1. A symbol OUT10-2 represents a signal for the signal wiring 10-2. A symbol OUT19-1 represents an electric potential of the wiring 19-1. A symbol OUT19-2 represents an electric potential of the wiring 19-2. Parameters t1 to t4 represent time. A parameter T1 represents a period from the time t1 to the time t2. A parameter T2 represents a period from the time t3 to the time t4. The period T1 is one example of a first period, and the period T2 is one example of a second period.

At the time t1, the signal SEL(m) has an active level (or a high level), and the selection transistor M4 is in an ON state. In addition, the signal TX(m) has an inactive level (or a low level), and the transfer transistor M1 is in an OFF state.

Before the time t1, the signal RES(m) has an active level (or a high level), and the reset transistor M2 is in an ON state, that is, the reset transistor M2 performs a reset operation for resetting the electric potential of the floating diffusion FD1.

At the time t1, the level of the signal RES(m) changes from the active level (or the high level) to an inactive level (or a low level), so that the state of the reset transistor M2 changes from the ON state to an OFF state. With this operation, a reset potential of the floating diffusion FD1 that is obtained by performing the reset operation is sampled and held by the charge conversion portion C1. Thus, in the period T1, the signal OUT10-1 that represents a potential V1 is outputted to the signal wiring 10-1 via the amplification transistor M3. The potential V1 is one example of a first potential, and is also a reset potential.

At the time t2 at which the period T1 has elapsed since the time t1, the level of the signal TX(m) changes from an inactive level (or a low level) to an active level (or a high level), so that the transfer transistor M1 turns ON. With this operation, the signal charge accumulated in the detection diode D1 is transferred to the floating diffusion FD1.

After that, at the time t3, the level of the signal TX(m) changes from the active level (or the high level) to the inactive level (or the low level), so that the transfer transistor M1 turns OFF. With this operation, the potential that is based on the signal charge transferred to the floating diffusion FD1 is sampled and held by the charge conversion portion C1. Thus, in the period T2, the signal OUT10-1 that represents a potential V2 that is based on the signal charge transmitted from the detection diode D1 is outputted to the signal wiring 10-1 via the amplification transistor M3. The potential V2 is one example of a second potential, and is also a signal potential.

At the time t4 at which the period T2 has elapsed since the time t3, the level of the signal RES(m) changes from the inactive level (or the low level) to the active level (or the high level), so that the reset transistor M2 turns ON.

After the time t4, the pixels 11 in the(m+4)th to the(m+7)th rows are driven like the pixels 11 in the m-th to the(m+3) rows.

In the above-described operation, in the period T2, the potential V2 lower than the potential V1 is outputted to the signal wiring 10-1, as the signal OUT10-1, via the amplification transistor M3. In a column circuit connected to the signal wiring 10-1, a digital signal based on the signal OUT10-1 is produced by performing the correlated double sampling. Like the potential of the signal OUT10-1 transmitted through the signal wiring 10-1, the potential of each of the signals transmitted though the signal wirings 10-2 to 10-4 also changes, and digital signals are produced in column circuits that correspond to the signal wirings 10-2 to 10-4.

In the period T1, the potential control circuit 20-1 controls a potential OUT19-1 of the wiring 19-1 at a potential V3. In addition, in the period T2, the potential control circuit 20-1 controls the potential OUT19-1 of the wiring 19-1 at a potential V4 different from the potential V3. The potential V3 is one example of a third potential, and the potential V4 is one example of a fourth potential.

The polarity of the potential V4 with respect to the potential V3 is the same as the polarity of the potential V2 with respect to the potential V1. In the first embodiment, since the electric charge is electrons, the potential V2 is lower than the potential V1. Thus, in the first embodiment, the potential V4 is lower than the potential V3. Note that although not illustrated in the figures, the potential V2 is higher than the potential V1 if the electric charge is holes. In this case, the potential V4 is higher than the potential V3.

In the first embodiment, the potential control circuit 20-1 is a voltage source that can adjust the potential outputted to the wiring 19-1. Specifically, the potential control circuit 20-1 adjusts the potential OUT19-1 into the potential V3 at a timing of the time t1, and into the potential V4 at a timing between the time t2 and the time t3.

Each of the potentials V3 and V4 is a fixed potential. That is, each of the potentials V3 and V4 is a potential that has a predetermined potential value. The potential V3 is set at a value calculated by performing a predetermined computation so that the potential V3 has substantially the same potential value as that of the potential V1. The potential V4 is set at a value calculated by performing a predetermined computation so that the potential V4 has substantially the same potential value as that of the potential V2.

For example, the potential V3 has a potential value calculated by using the reset potential, a voltage that lowers due to the coupling between the reset transistor M2 and the charge conversion portion C1, and the amplification factor of the amplification transistor M3. In addition, the potential V4 has a voltage value calculated by using the estimated amount of signal charge and the capacitance value of the charge conversion portion C1.

As described above, in the first embodiment, the potential control circuit 20-1 controls the potential of the wiring 19-1 so that the potential of the wiring 19-1 follows the potential of a signal that is transmitted through any one of the signal wirings 10-1 to 10-4 included in the signal wiring group 10. That is, the potential control circuit 20-1 outputs a potential (signal) that simulates a signal outputted from a pixel 11, to the wiring 19-1.

Note that in the first embodiment, since the signals are outputted from pixels 11 to the respective signal wirings 10-1 to 10-4 in synchronization with each other, the potentials of the signals transmitted through the respective signal wirings 10-1 to 10-4 change similarly with each other, with time. For this reason, the potential outputted to the wiring 19-1 may follow any one of signals transmitted through the signal wirings 10-1 to 10-4. In the first embodiment, since the signal wiring 10-1 and the wiring 19-1 are disposed adjacent to each other in the wiring layer WL2, it is preferable that the potential control circuit 20-1 control the potential of the wiring 19-1 so that the potential of the wiring 19-1 follows the potential of the signal transmitted through the signal wiring 10-1. Similarly, it is preferable that the potential control circuit 20-2 control the potential of the wiring 19-2 so that the potential of the wiring 19-2 follows the potential of the signal transmitted through the signal wiring 10-4.

By the way, the signal wiring 10-2 is interposed between the two signal wirings 10-1 and 10-3, and the signal wiring 10-3 is interposed between the two signal wirings 10-2 and 10-4. Thus, each of the signal wirings 10-2 and 10-3 is shielded by the corresponding two signal wirings. As a result, the parasitic capacitance between each of the signal wirings 10-2 and 10-3 and components, such as transistors and wirings, around the signal wiring is reduced. In addition, the potential of the signal transmitted through each of the signal wirings 10-2 and 10-3 and the potential of the signal transmitted through each of the corresponding two signal wirings change similarly with each other, with time. Thus, the apparent parasitic capacitance between each of the signal wirings 10-2 and 10-3 and the two corresponding signal wirings is reduced. As a result, the reading speed of signals transmitted through the signal wirings 10-2 and 10-3 can be increased.

Furthermore, in the first embodiment, since the signal wiring 10-1 is disposed adjacent to the signal wiring 10-2 and the wiring 19-1 in the wiring layer WL2, the signal wiring 10-1 is shielded by the signal wiring 10-2 and the wiring 19-1. As a result, the parasitic capacitance between the signal wiring 10-1 and components, such as transistors and wirings, around the signal wiring 10-1 is reduced. In addition, the potential of the signal transmitted through the signal wiring 10-1 and the potential of the signal transmitted through the signal wiring 10-2 change similarly with each other, with time. Thus, the apparent parasitic capacitance between the signal wiring 10-1 and the signal wiring 10-2 is reduced. In addition, in the first embodiment, the potential of the wiring 19-1 is controlled so that the potential of the wiring 19-1 follows the potential of the signal transmitted through the signal wiring 10-1. Thus, the apparent parasitic capacitance between the signal wiring 10-1 and the wiring 19-1 is reduced. As a result, the reading speed of the signal transmitted through the signal wiring 10-1 can be increased. Similar to the reading speed of the signal transmitted through the signal wiring 10-1, the reading speed of the signal transmitted through the signal wiring 10-4 can also be increased.

The image pickup apparatus 1 of the first embodiment can also be applied to a radiation detector. As a comparative example, a radiation detector in which the wirings 19-1 and 19-2 are not disposed in the image pickup apparatus 1 of the first embodiment will be described. In a radiation detector, it is known that if the radiation is incident on the radiation detector, the electric charge is produced in an insulation layer, and held by the insulation layer. The present inventors have found that the electric charge held by the insulation layer affects the potential of a signal transmitted through a signal wiring. In particular, the electric charge affects the potential of the signal transmitted through the signal wirings 10-1 and 10-4 (of the signal wirings 10-1 to 10-4 included in the signal wiring group 10) positioned on edge sides in the X direction. Since the amount of electric charge held by the insulation layer increases as the absorbed dose increases, the output from pixels deviates from a desired output in accordance with the dosage of radiation. Thus, this phenomenon occurs as a deterioration of the sensor.

The present inventors consider the deterioration as follows. That is, the amount of electric charge caused by irradiation with radiation and held by the insulation layer depends on the electric field applied to the insulation layer when the insulation layer is irradiated with the radiation. In addition, the degree of change in the property of the sensor operation depends on an electric field around the electric charge held by the insulation layer. As the electric field increases, the influence of the electric charge held by the insulation layer increases accordingly. As a result, the deterioration resistance of the radiation detector decreases. Consequently, in an image obtained after the radiation detector deteriorates, the difference between electric fields around the signal wirings appears in the sensor output, as a fixed pattern noise produced in each pixel column. In this phenomenon, a slight difference (the fixed pattern noise) between columns that cannot be visually recognized before the deterioration occurs is increased in accordance with the level of the deterioration, and will be visually recognized.

In the comparative example, since each of the signal wirings 10-2 and 10-3 is interposed between two signal wirings, the electric field around one of the signal wirings 10-2 and 10-3 is substantially equal to the electric field around the other. However, the signal wirings 10-1 and 10-4 are signal wirings disposed on the edge sides of the signal wiring group 10. Thus, the electric field around the signal wirings 10-1 and 10-4 changes unlike the electric field around the others of the signal wiring group 10, and causes the increase in the fixed pattern noise after the radiation detector deteriorates.

In contrast, in the first embodiment, the wiring 19-1 supplied with the potential that simulates the output to the signal wiring 10-1 is disposed adjacent to the signal wiring 10-1 in the wiring layer WL2. Thus, the electric field around the signal wiring 10-1 can be nearly equal to the electric field around each of the signal wirings 10-2 and 10-3. As a result, the fixed pattern noise, caused by the difference in the deterioration resistance between the signal wiring 10-1 and the signal wirings 10-2 and 10-3 and produced in each pixel column, can be reduced.

Note that the above description has been made for the case where the potential OUT19-1 and the potential OUT19-2 change at the same timing and have the same level. However, the present disclosure is not limited to this. For example, the timing at which the potential OUT19-1 changes and the timing at which the potential OUT19-2 changes may be shifted from each other, and the level of the potential OUT19-1 and the level of the potential OUT19-2 may be shifted from each other.

In addition, in the present embodiment, the potential control circuits 20-1 and 20-2 are respectively connected to the wirings 19-1 and 19-2. However, the present disclosure is not limited to this. For example, one of the potential control circuits 20-1 and 20-2 may be connected to the two wirings 19-1 and 19-2, and may control the potential of the two wirings 19-1 and 19-2. In this case, the other of potential control circuits 20-1 and 20-2 may not be disposed.

Second Embodiment

Next, a second embodiment of the present disclosure will be described. Hereinafter, a component given a reference symbol identical to a reference symbol of a component of the first embodiment has substantially the same structure and effects as those of the component of the first embodiment, unless otherwise specified, and features different from those of the first embodiment will be mainly described.

Figure 6:
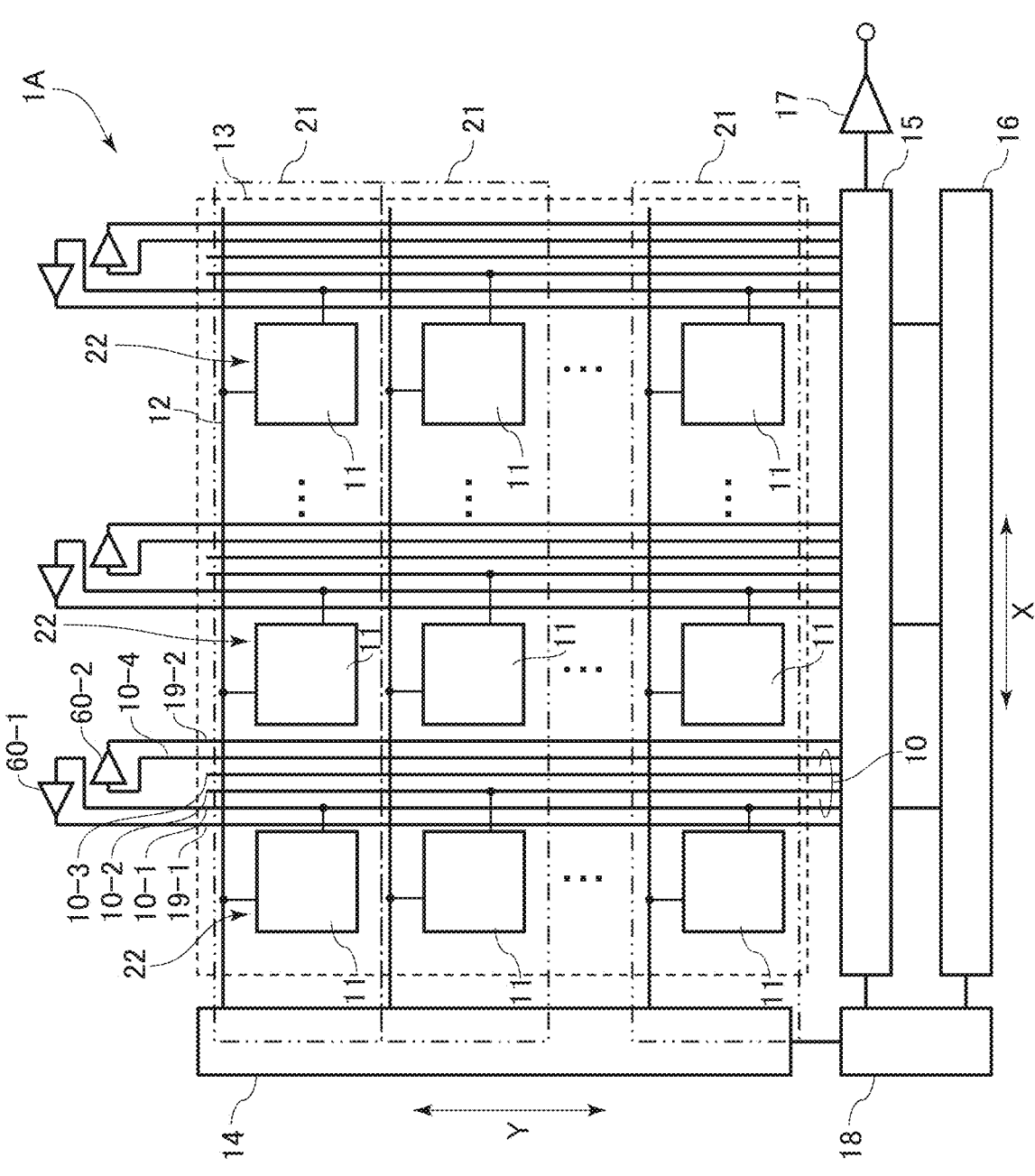
FIG. 6 is a block diagram illustrating a schematic configuration of an image pickup apparatus that is one example of a detector of a second embodiment.

FIG. 6 is a block diagram illustrating a schematic configuration of an image pickup apparatus 1A that is one example of a detector of the second embodiment. The image pickup apparatus 1A includes buffer circuits 60-1 and 60-2 as one example of a control portion, instead of the potential control circuits 20-1 and 20-2 of the first embodiment. The buffer circuit 60-1 is a circuit that outputs a signal from any one of the signal wirings included in the signal wiring group 10, to the wiring 19-1. Preferably, the buffer circuit 60-1 outputs a signal from the signal wiring 10-1, to the wiring 19-1. The buffer circuit 60-2 is a circuit that outputs a signal from any one of the signal wirings included in the signal wiring group 10, to the wiring 19-2. Preferably, the buffer circuit 60-2 outputs a signal from the signal wiring 10-4, to the wiring 19-2. The input terminal of the buffer circuit 60-1 is connected to the signal wiring 10-1, and the output terminal of the buffer circuit 60-1 is connected to the wiring 19-1.

The signal outputted from the pixel 11 to the signal wiring 10-1 is fed back to the wiring 19-1 by the buffer circuit 60-1. Thus, the potential of the wiring 19-1 is controlled by the buffer circuit 60-1 so that the potential of the wiring 19-1 follows the potential of the signal transmitted through the signal wiring 10-1 of the signal wiring group 10. In addition, the signal outputted from the pixel 11 to the signal wiring 10-4 is fed back to the wiring 19-2 by the buffer circuit 60-2. Thus, the potential of the wiring 19-2 is controlled by the buffer circuit 60-2 so that the potential of the wiring 19-2 follows the potential of the signal transmitted through the signal wiring 10-4 of the signal wiring group 10.

Preferably, each of the buffer circuits 60-1 and 60-2 is a positive-feedback amplification circuit with an amplification factor of 1. However, the present disclosure is not limited to this. For example, instead of the buffer circuit, a source follower circuit that has the same configuration as that of the pixel 11 may be used, or a circuit that has the same configuration as that of the output circuit 17 may be used.

In the second embodiment, a signal that is in phase with the signal transmitted through the signal wiring 10-1 is transmitted through the wiring 19-1 by the buffer circuit 60-1. Thus, the potential of the wiring 19-1 is allowed to more accurately follow the potential of the signal transmitted through the signal wiring 10-1. As a result, the difference in potential between the signal wiring 10-1 and the wiring 19-1 can be kept constant over the time. In addition, the potential value of the wiring 19-1 can be made nearly equal to the amplitude of the signal transmitted through the signal wiring 10-1. As a result, the difference in potential between the signal wiring 10-1 and the wiring 19-1 can be made smaller. Consequently, the apparent parasitic capacitance between the signal wiring 10-1 and the wiring 19-1 can be further reduced, so that the reading speed of the signal can be increased. Similar to the reading speed of the signal transmitted through the signal wiring 10-1, the reading speed of the signal transmitted through the signal wiring 10-4 can also be increased.

The image pickup apparatus 1A can be applied to a radiation detector. Also in this case, the fixed pattern noise produced in each pixel column can be reduced.

Third Embodiment

Next, a third embodiment of the present disclosure will be described. Hereinafter, a component given a reference symbol identical to a reference symbol of a component of the first embodiment has substantially the same structure and effects as those of the component of the first embodiment, unless otherwise specified, and features different from those of the first embodiment will be mainly described.

Figure 7:
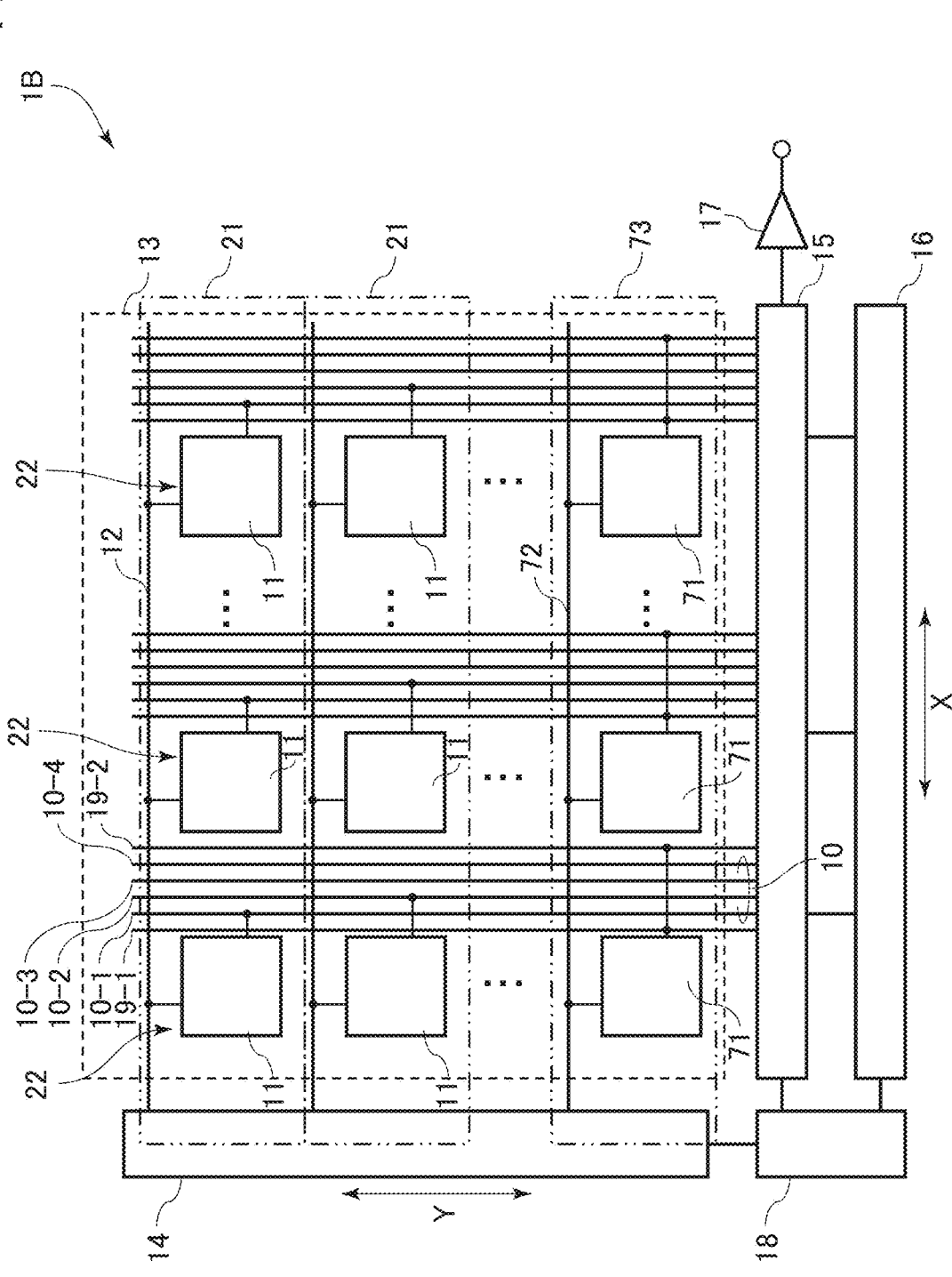
FIG. 7 is a block diagram illustrating a schematic configuration of an image pickup apparatus that is one example of a detector of a third embodiment.

FIG. 7 is a block diagram illustrating a schematic configuration of an image pickup apparatus 1B that is one example of a detector of the third embodiment. In the image pickup apparatus 1B, the pixel array 13 of the first embodiment is added with a pixel row 73. The pixel row 73 includes pixels 71 whose number is the same as the number of pixels 11 of the pixel row 21. The pixels 71 included in the pixel row 73 are connected to a control line 72 that extends from the vertical scanning circuit 14. The pixels 71 of the pixel row 73 have the same configuration as that of the pixels 11 of the pixel row 21. Each of the pixels 11 included in the pixel row 21 is one example of a first pixel, and each of the pixels 71 included in the pixel row 73 is one example of a second pixel. The pixels 71 are not used in the generation of the pixel signal (pixel data) outputted by the output circuit 17.

In the third embodiment, the pixel 71 is one example of a control portion. The pixel 71 is connected to the wirings 19-1 and 19-2. In addition, the pixel 71 controls the potential of the wirings 19-1 and 19-2, depending on the signal from the vertical scanning circuit 14, so that the potential of the wirings 19-1 and 19-2 follows the potential of the signal transmitted through any one of the signal wirings of the signal wiring group 10. In the third embodiment, the pixel 71 outputs a signal to the wirings 19-1 and 19-2, in synchronization with four pixels 11 included in the pixel column 22.

Figure 8:
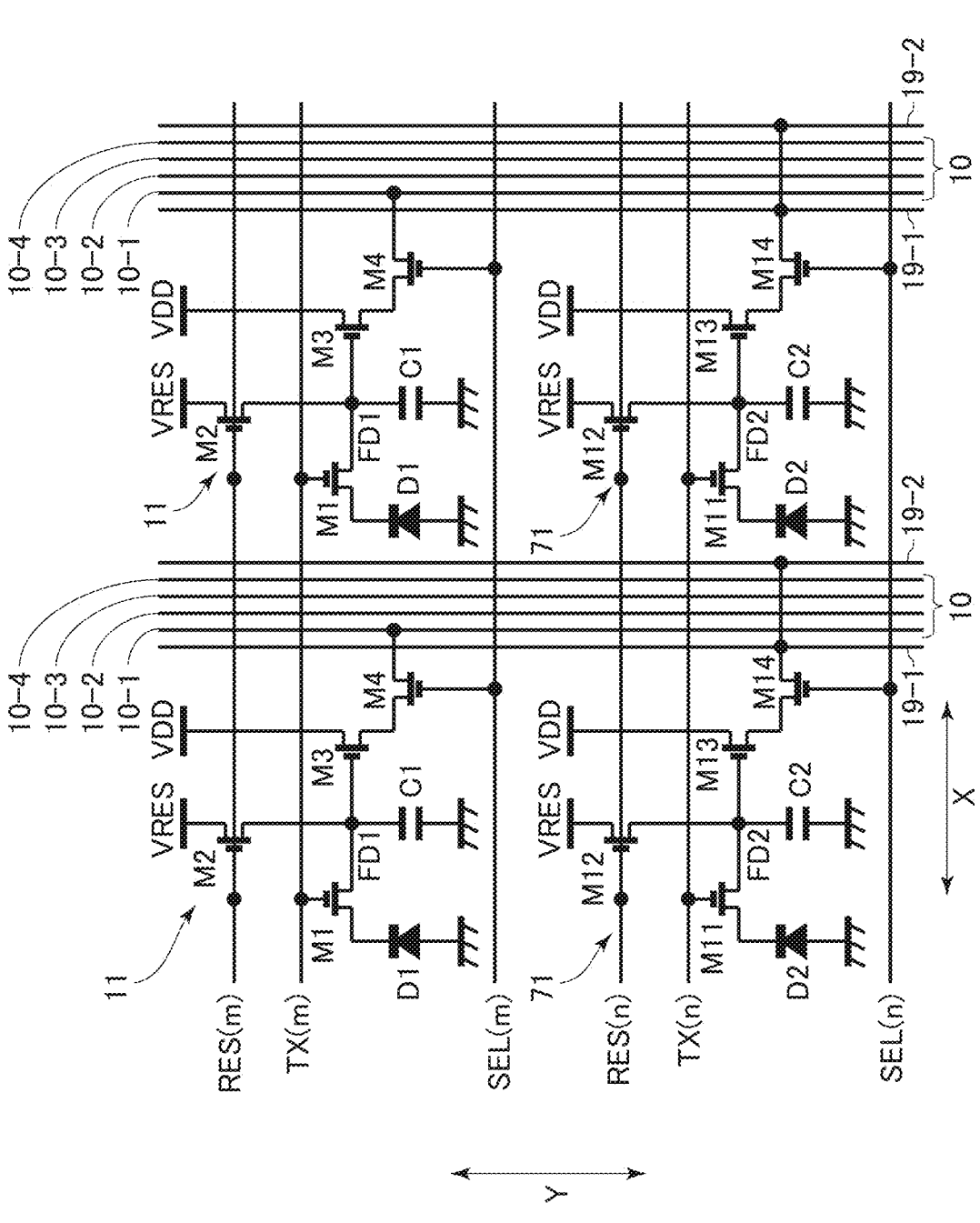
FIG. 8 is an equivalent circuit diagram of a pixel of the third embodiment.

Hereinafter, a configuration of the pixels 71 (connected to the control line 72) of the pixel row 73 will be described. FIG. 8 is an equivalent circuit diagram of the pixel 11 and the pixel 71 of the third embodiment. FIG. 8 illustrates circuits of pixels 11 in one row and two columns, and circuits of pixels 71 in one row and two columns.

The pixels 71 illustrated in FIG. 8 have the same configuration as that of the pixels 11. That is, the pixel 71 includes a detection diode D2, a transfer transistor M11, a reset transistor M12, an amplification transistor M13, a selection transistor M14, and a floating diffusion FD2. In addition, a charge conversion portion C2 is formed between the floating diffusion FD2 and the ground. The detection diode D2 is one example of a second conversion portion. The transfer transistor M11 is one example of a second transfer transistor. The reset transistor M12 is one example of a second reset transistor. The amplification transistor M13 is one example of a second amplification transistor. The selection transistor M14 is one example of a second selection transistor. The floating diffusion FD2 is one example of a second floating diffusion.

Hereinafter, potential control of the wirings 19-1 and 19-2 performed by the pixel 71 (connected to the control line 72) of the pixel row 73 will be described.

Figure 9:
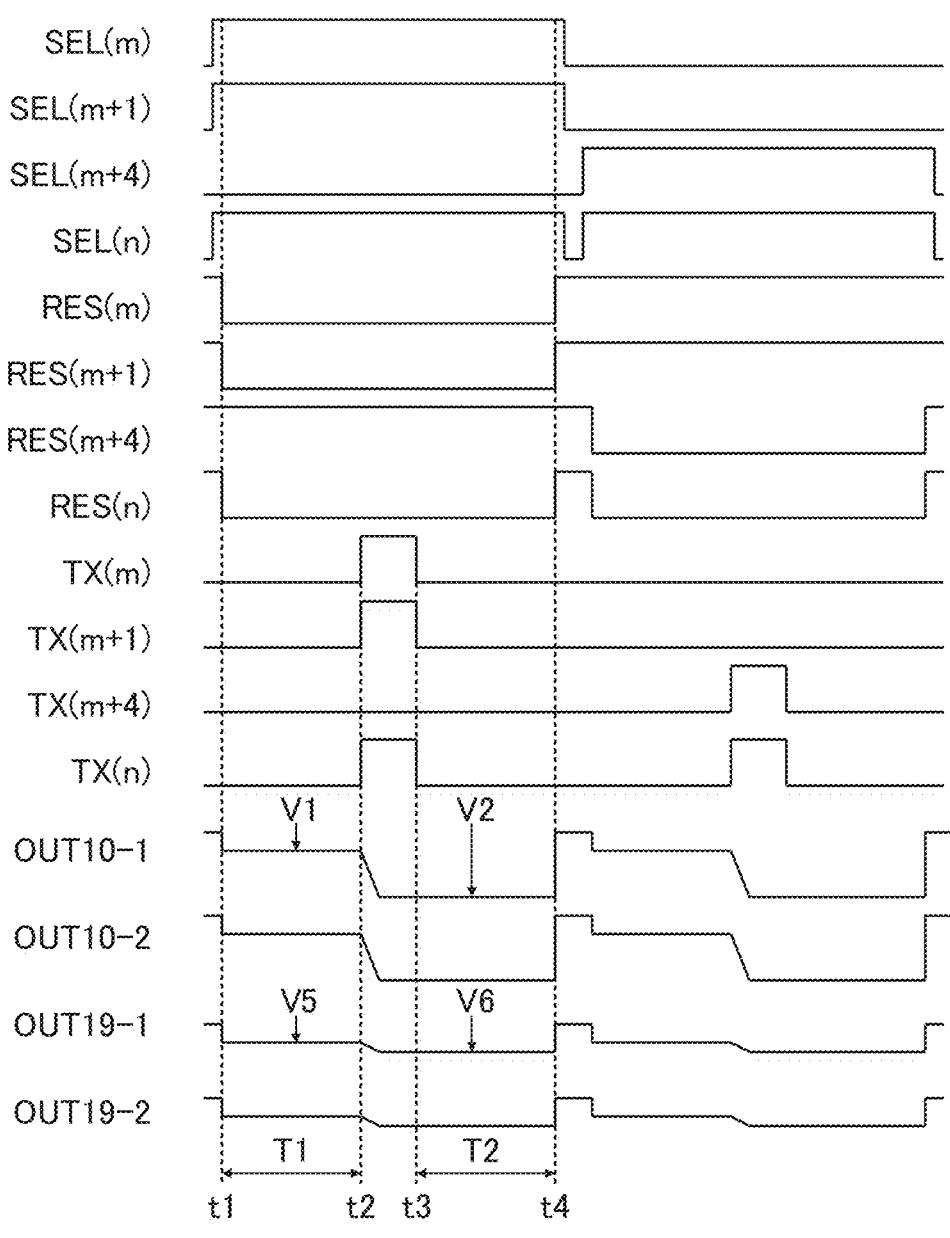
FIG. 9 is a timing chart illustrating one example of timings for driving the image pickup apparatus of the third embodiment.

FIG. 9 is a timing chart illustrating one example of timings for driving the image pickup apparatus 1B of the third embodiment. Also in the third embodiment, four pixel rows 21 are driven in synchronization with each other, as in the first embodiment. Hereinafter, as in the first embodiment, two of four pixels 11 (included in a single pixel column 22) that correspond to the signal wirings 10-1 and 10-2 will be described.

The timing at which the level of the signals SEL(m) and SEL(m+1) changes between the active level (or the high level) and the inactive level (or the low level), the timing at which the level of the signals RES(m) and RES(m+1) changes between the active level (or the high level) and the inactive level (or the low level), and the timing at which the level of the signals TX(m) and TX(m+1) changes between the active level (or the high level) and the inactive level (or the low level) are the same as those described in the first embodiment.

A pixel 11 disposed in the m-th row and connected to the signal wiring 10-1 is selected by the signal SEL(m), and outputs a signal OUT10-1. Similarly, a pixel 11 disposed in the (m+1)th row and connected to the signal wiring 10-2 is selected by the signal SEL(m+1), and outputs a signal OUT10-2. Thus, as in the first embodiment, the image pickup apparatus 1B allows the pixel array 13 to output signals, by making the pixels 11 become active at different timings in accordance with the physical addresses of the pixels 11. The symbols RES(n), SEL(n), and TX(n) represent signals of the control line 72.

At the time t1, the signal SEL(n) has an active level (or a high level), and the selection transistor M14 is in an ON state. In addition, the signal TX(n) has an inactive level (or a low level), and the transfer transistor M11 is in an OFF state.

Before the time t1, the signal RES(n) has an active level (or a high level), and the reset transistor M12 is in an ON state, that is, the reset transistor M12 performs a reset operation for resetting the electric potential of the floating diffusion FD2.

At the time t1, the level of the signal RES(n) changes from the active level (or the high level) to an inactive level (or a low level), so that the state of the reset transistor M12 changes from the ON state to an OFF state. With this operation, a reset potential of the floating diffusion FD2 that is obtained by performing the reset operation is sampled and held by the charge conversion portion C2. Thus, in the period T1, the signals OUT19-1 and OUT19-2 that represent a potential V5 are respectively outputted to the signal wirings 19-1 and 19-2 via the amplification transistor M13. The potential V5 is one example of a third potential.

At the time t2 at which the period T1 has elapsed since the time t1, the level of the signal TX(n) changes from an inactive level (or a low level) to an active level (or a high level), so that the transfer transistor M11 turns ON. With this operation, the signal charge accumulated in the detection diode D2 is transferred to the floating diffusion FD2.

After that, at the time t3, the level of the signal TX(n) changes from the active level (or the high level) to the inactive level (or the low level), so that the transfer transistor M11 turns OFF. With this operation, the potential that is based on the signal charge transferred to the floating diffusion FD2 is sampled and held by the charge conversion portion C2. Thus, in the period T2, the signals OUT19-1 and OUT19-2 that represent a potential V6 that is based on the signal charge transmitted from the detection diode D2 are respectively outputted to the signal wirings 19-1 and 19-2 via the amplification transistor M13. The potential V6 is one example of a fourth potential.

At the time t4 at which the period T2 has elapsed since the time t3, the level of the signal RES(n) changes from the inactive level (or the low level) to the active level (or the high level), so that the reset transistor M2 turns ON.

The polarity of the potential V6 with respect to the potential V5 is the same as the polarity of the potential V2 with respect to the potential V1. In the third embodiment, since the electric charge is electrons, the potential V2 is lower than the potential V1. Thus, in the third embodiment, the potential V6 is lower than the potential V5. Note that although not illustrated in the figures, the potential V2 is higher than the potential V1 if the electric charge is holes. In this case, the potential V6 is higher than the potential V5.

In the third embodiment, every time four pixel rows 21 are selected, the pixel 71 (connected to the control line 72) of the pixel row 73 is selected by the signal SEL(n), and outputs the potentials OUT19-1 and OUT19-2 to the wirings 19-1 and 19-2, respectively.

In the third embodiment, the pixel 71 is driven in synchronization with the pixel 11. Thus, in the period T1, the pixel 71 outputs the potential V5 to the wirings 19-1 and 19-2 in synchronization with the potential V1 outputted to the signal wiring 10-1 by the pixel 11. In addition, in the period T2, the pixel 71 outputs the potential V6 to the wirings 19-1 and 19-2 in synchronization with the potential V2 outputted to the signal wiring 10-1 by the pixel 11.

As described above, in the third embodiment, the pixel 71 controls the potential of the wirings 19-1 and 19-2 so that the potential of the wirings 19-1 and 19-2 follows the potential of a signal that is transmitted through any one of the signal wirings 10-1 to 10-4 included in the signal wiring group 10.

In the third embodiment, since the pixel 11 connected to the signal wiring 10-1 and the pixel 71 connected to the wirings 19-1 and 19-2 have configurations equal to each other, the amount of fall of potential and the capacitance of the charge conversion portion in one of the pixels 11 and 71 are nearly equal to those in the other. Thus, the pixel 71 can output the potential that more accurately simulates the potential of the signal wiring 10-1, to the wiring 19-1. As a result, particularly in a case where an image of an object that involves a low signal level is captured, the reading speed of the signal can be increased. In addition, since the image pickup apparatus 1B does not need the additional voltage control circuit or buffer circuit, the image pickup apparatus 1B can be downsized, and the size and power consumption of a chip of the image pickup apparatus 1B can be reduced.

The image pickup apparatus 1B can be applied to a radiation detector. Also in this case, the fixed pattern noise produced in each pixel column can be reduced.

Fourth Embodiment

Next, a fourth embodiment of the present disclosure will be described. Hereinafter, a component given a reference symbol identical to a reference symbol of a component of the first embodiment has substantially the same structure and effects as those of the component of the first embodiment, unless otherwise specified, and features different from those of the first embodiment will be mainly described.

Figure 10:
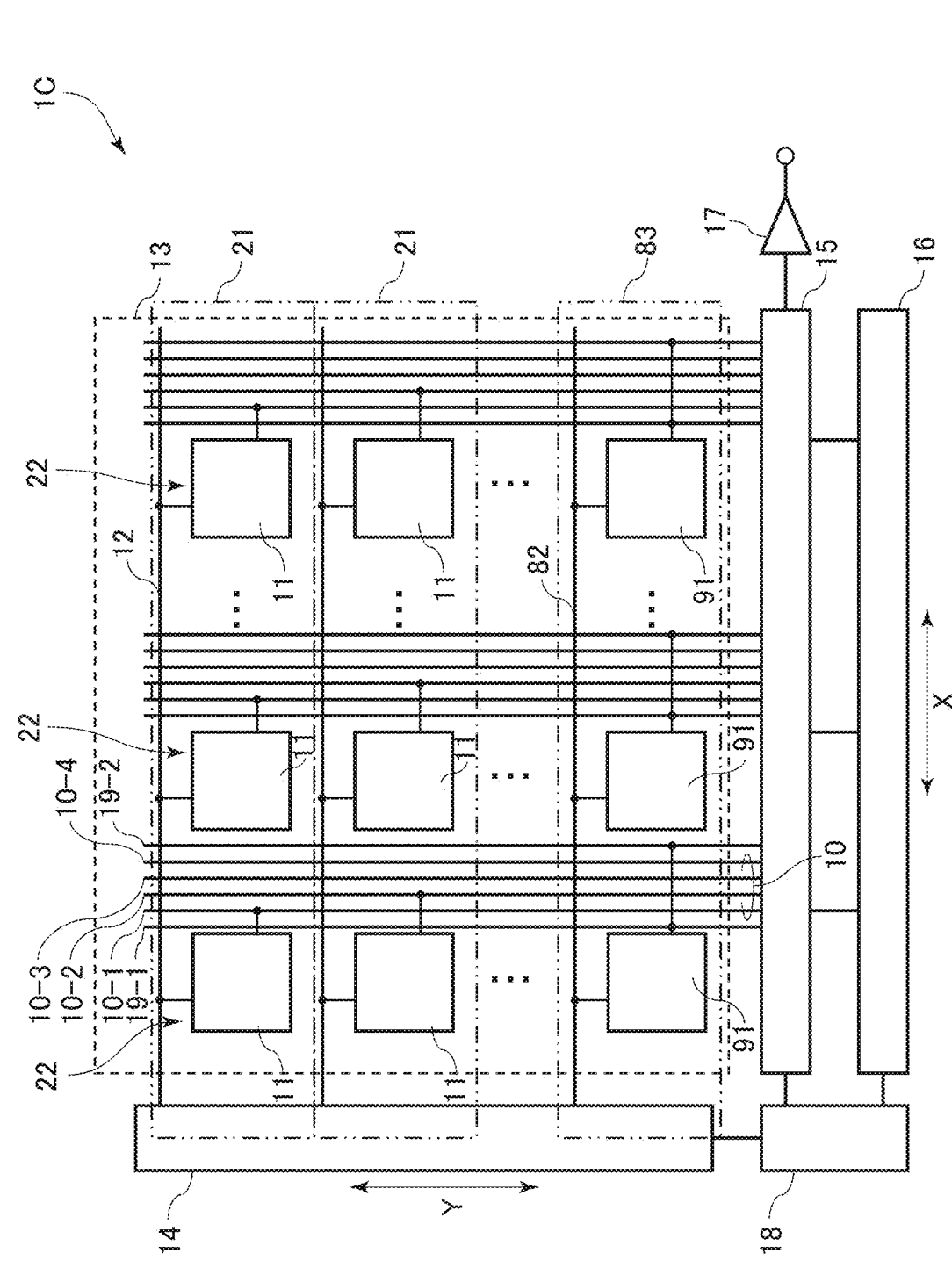
FIG. 10 is a block diagram illustrating a schematic configuration of an image pickup apparatus that is one example of a detector of a fourth embodiment.

FIG. 10 is a block diagram illustrating a schematic configuration of an image pickup apparatus 1C that is one example of a detector of the fourth embodiment. In the image pickup apparatus 1C, the pixel array 13 of the first embodiment is added with a pixel row 83. The pixel row 83 includes pixels 91 whose number is the same as the number of pixels 11 of the pixel row 21.

The pixels 91 included in the pixel row 83 are connected to a control line 82 that extends from the vertical scanning circuit 14. The pixels 91 of the pixel row 83 have a configuration different from that of the pixels 11 of the pixel row 21. Each of the pixels 11 included in the pixel row 21 is one example of a first pixel, and each of the pixels 91 included in the pixel row 83 is one example of a second pixel. The pixels 91 are not used in the generation of the pixel signal (pixel data) outputted by the output circuit 17.

The pixel 91 of the fourth embodiment is a so-called dummy pixel. That is, the pixel 91 does not have the detection diode, or has the detection diode, but does not output the signal based on the electric charge accumulated in the detection diode, to the signal wirings 10-1 to 10-4.

In the fourth embodiment, the pixel 91 is one example of a control portion. The pixel 91 is connected to the wirings 19-1 and 19-2. In addition, the pixel 91 controls the potential of the wirings 19-1 and 19-2, depending on the signal from the vertical scanning circuit 14, so that the potential of the wirings 19-1 and 19-2 follows the potential of the signal transmitted through any one of the signal wirings of the signal wiring group 10. In the fourth embodiment, the pixel 91 outputs a signal to the wirings 19-1 and 19-2, in synchronization with four pixels 11 included in the pixel column 22.

Figure 11:
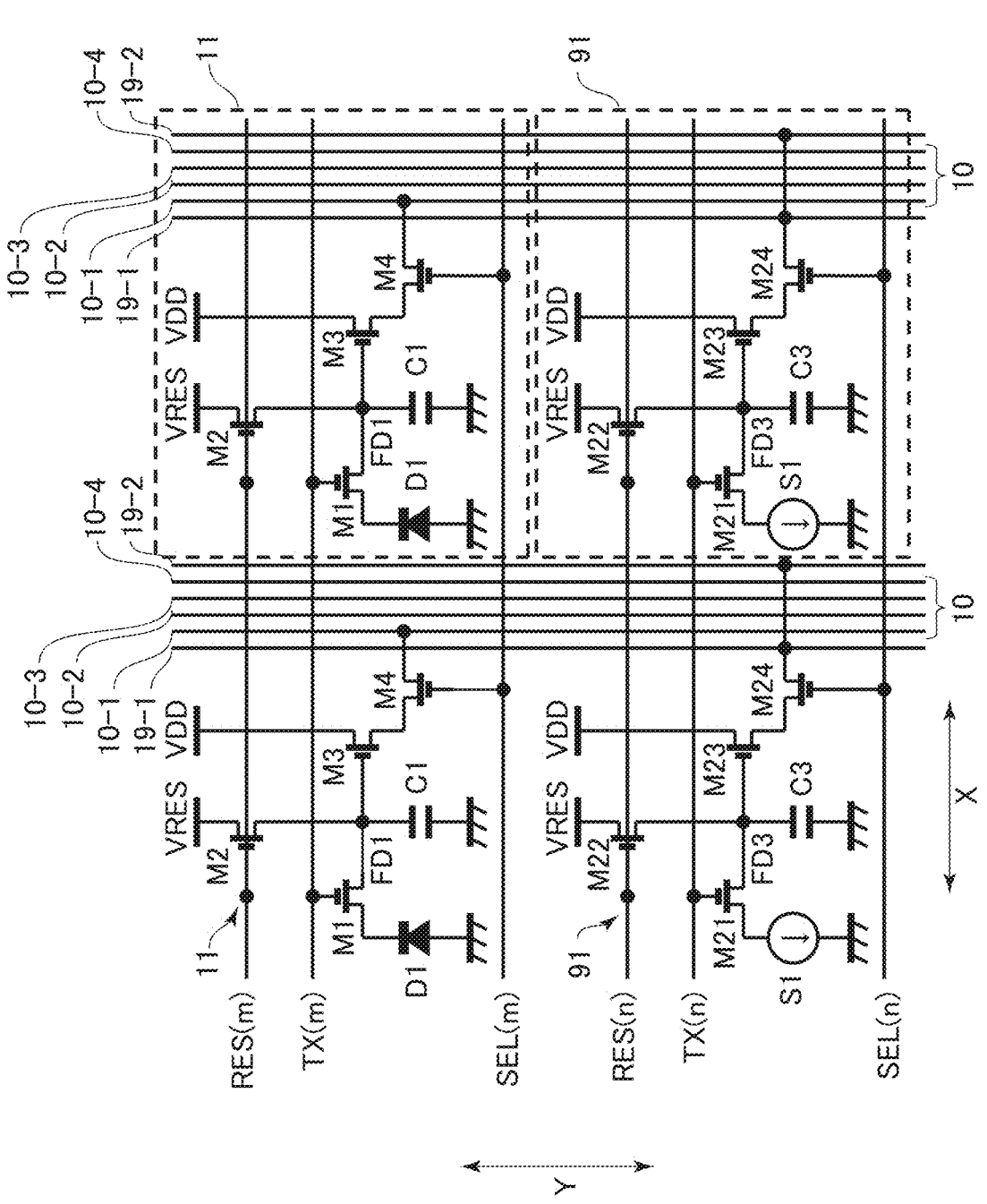
FIG. 11 is an equivalent circuit diagram of a pixel of the fourth embodiment.

Hereinafter, a configuration of the pixels 91 (connected to the control line 82) of the pixel row 83 will be described. FIG. 11 is an equivalent circuit diagram of the pixel 11 and the pixel 91 of the fourth embodiment. FIG. 11 illustrates circuits of pixels 11 in one row and two columns, and circuits of pixels 91 in one row and two columns.

The pixel 91 illustrated in FIG. 11 does not include the detection diode, and includes a current source S1 instead of the detection diode. That is, the pixel 91 includes the current source S1, a transfer transistor M21, a reset transistor M22, an amplification transistor M23, a selection transistor M24, and a floating diffusion FD3. In addition, a charge conversion portion C3 is formed between the floating diffusion FD3 and the ground. The transfer transistor M21 is one example of a second transfer transistor. The reset transistor M22 is one example of a second reset transistor. The amplification transistor M23 is one example of a second amplification transistor. The selection transistor M24 is one example of a second selection transistor. The floating diffusion FD3 is one example of a second floating diffusion. The electric charge transferred from the current source S1 is held by the floating diffusion FD3.

The signal RES(n), the signal TX(n), and the signal SEL(n) that drive the pixel 91 operate at the timing illustrated in FIG. 9 of the third embodiment. Thus, the pixel 91 becomes active every time the pixel 11 in each row is selected.

In the fourth embodiment, the amplification transistor M23 and the selection transistor M24, which are connected to the wirings 19-1 and 19-2, and the amplification transistor M3 and the selection transistor M4, which are connected to the signal wiring 10-1, are made with the same precision (i.e., accuracy in the process). Thus, the potentials OUT19-1 and OUT19-2 supplied to the wirings 19-1 and 19-2 can simulate the potential of the signal OUT10-1 with high accuracy.

In addition, the detection diode is simulated by the current source S1. Thus, particularly in a case where an image of an object that involves a high signal level is captured, the difference in potential between the signal wiring 10-1 and the wiring 19-1, and the difference in potential between the signal wiring 10-4 and the wiring 19-2 can be reduced with high accuracy. As a result, the reading speed of signals transmitted through the signal wirings 10-1 and 10-4 can be increased.

Figure 12:
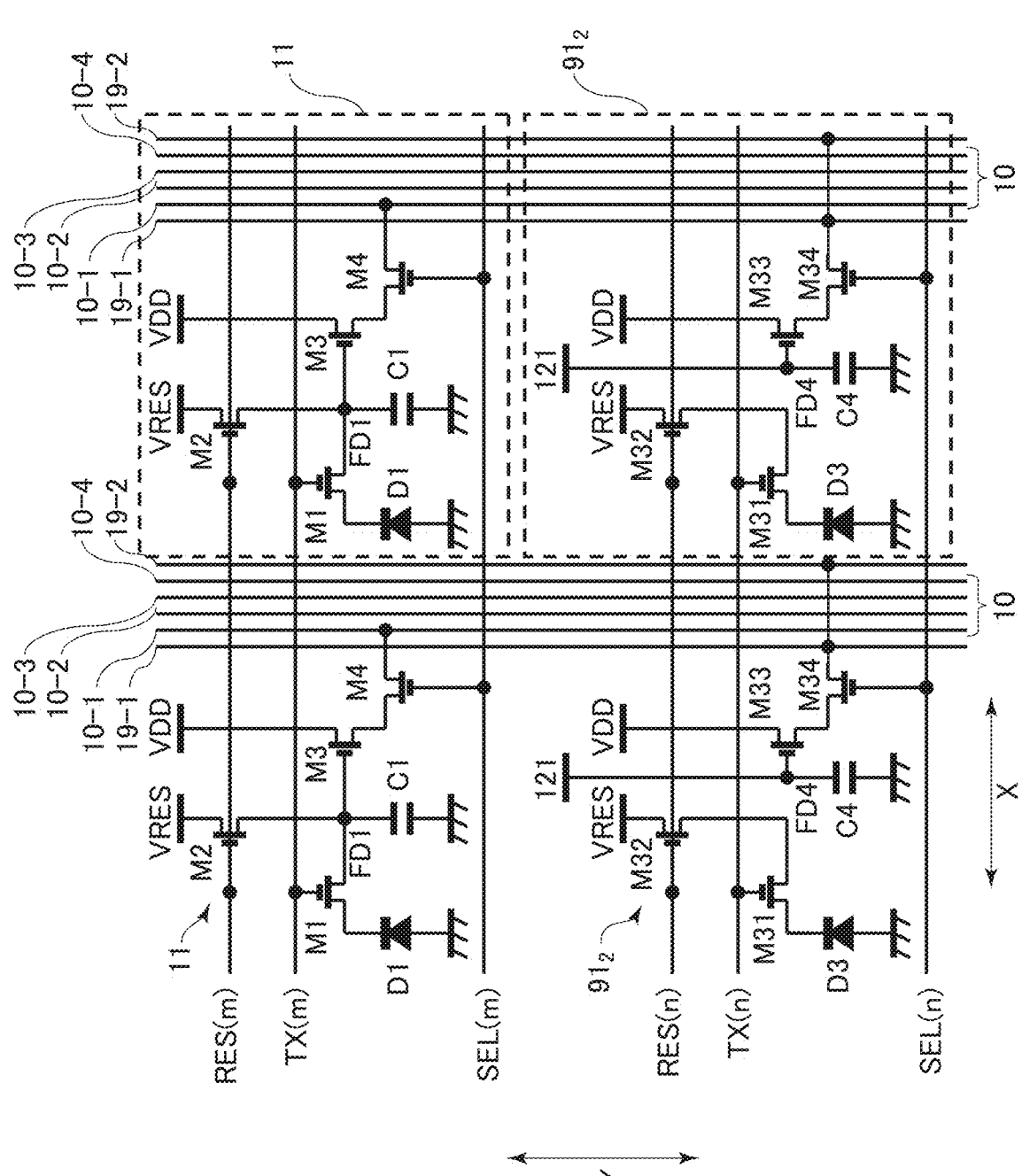
FIG. 12 is an equivalent circuit diagram of a pixel of a modification of the fourth embodiment.

FIG. 12 is an equivalent circuit diagram of a pixel 912 of a modification of the fourth embodiment. FIG. 12 illustrates circuits of pixels 11 in one row and two columns, and circuits of pixels 912 in one row and two columns.

The pixel 912 illustrated in FIG. 12 includes a detection diode D3, a transfer transistor M31, a reset transistor M32, an amplification transistor M33, a selection transistor M34, and a floating diffusion FD4. In addition, a charge conversion portion C4 is formed between the floating diffusion FD4 and the ground. The transfer transistor M31 is one example of a second transfer transistor. The reset transistor M32 is one example of a second reset transistor. The amplification transistor M33 is one example of a second amplification transistor. The selection transistor M34 is one example of a second selection transistor. The floating diffusion FD4 is one example of a second floating diffusion.

The pixel 912 includes the detection diode D3. However, the signal based on the electric charge accumulated in the detection diode D3 is not discharged to any of the signal wirings 10-1 to 10-4. That is, since the transfer transistor M31 is not connected to the gate of the amplification transistor M33, the electric charge accumulated in the detection diode D3 is discharged, via the transfer transistor M31 and the reset transistor M32, to the power supply that outputs the voltage VRES.

In the configuration illustrated in FIG. 12, a voltage is applied to the gate of the amplification transistor M33 by the voltage source 121, and the potential of the wirings 19-1 and 19-2 is controlled via the selection transistor M34 that is in an ON state. For example, a power supply 121 has a circuit of a voltage source.

The signal SEL(n) operates at the driving timing that is the same as that of the third embodiment, illustrated in FIG. 9. Thus, the pixel 912 becomes active every time the pixel 11 in each row is selected. A potential outputted from the power supply 121 is applied to the gate of the amplification transistor M33. The amplification transistor M33 outputs a potential, based on the potential applied to the gate, to the wirings 19-1 and 19-2 via the selection transistor M34. As in the first embodiment, it is preferable that the power supply 121 output one potential in the period T1, and another potential different from the one potential, in the period T2.

In the modification of the fourth embodiment, the amplification transistor M33 and the selection transistor M34, which are connected to the wirings 19-1 and 19-2, and the amplification transistor M3 and the selection transistor M4, which are connected to the signal wiring 10-1, are made with the same precision (i.e., accuracy in the process). Thus, the potentials OUT19-1 and OUT19-2 supplied to the wirings 19-1 and 19-2 can simulate the potential of the signal OUT10-1 with high accuracy.

In addition, the detection diode is simulated by the power supply 121. Thus, particularly in a case where an image of an object that involves a high signal level is captured, the difference in potential between the signal wiring 10-1 and the wiring 19-1, and the difference in potential between the signal wiring 10-4 and the wiring 19-2 can be reduced with high accuracy. As a result, the reading speed of signals transmitted through the signal wirings 10-1 and 10-4 can be increased.

In addition, since the potentials OUT19-1 and OUT19-2 that simulate the signal OUT10-1 of the signal wiring 10-1 are set by the power supply 121, the reading speed of the signal can be further increased.

Fifth Embodiment

In a fifth embodiment, with reference to FIG. 13, a radiation-image pickup system 900 will be described as one example of a detection system that includes the detector.

Figure 13:
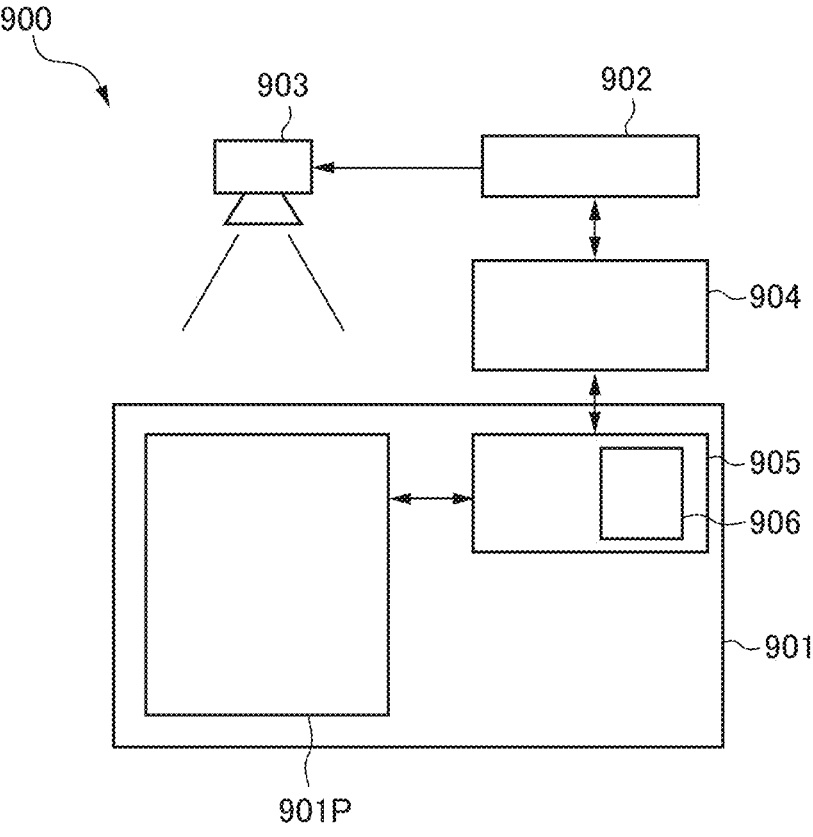
FIG. 13 is a schematic diagram of a radiation-image pickup system of a fifth embodiment.

The radiation-image pickup system 900 illustrated in FIG. 13 includes a radiation-image pickup apparatus 901, an irradiation control portion 902, a radiation source 903, and a computer 904. The radiation source 903 is an example of an irradiation portion that emits radiation (e.g., X rays), which is energy rays, to an object. The radiation-image pickup apparatus 901 includes an image pickup panel 901P, as a detector that detects the energy rays. In the image pickup panel 901P, pixel structures described, as an example, in the first to the fourth embodiments are arranged in a two-dimensional matrix.

The image pickup panel 901P may be a direct-conversion radiation detector in which the radiation is directly converted to the electric-charge signal. In another case, the image pickup panel 901P may be an indirect-conversion radiation detector in which the radiation is converted to fluorescence by a scintillator and then the fluorescence is directly converted to the signal charge.

The radiation source 903 starts to emit the radiation, depending on an irradiation command from the irradiation control portion 902. The radiation emitted from the radiation source 903 passes through an object whose image is to be captured (i.e., an object under test), and enters the image pickup panel 901P of the radiation-image pickup apparatus 901. The radiation source 903 stops emitting the radiation, depending on a stop command from the irradiation control portion 902.

For example, the radiation-image pickup apparatus 901 is a flat-panel detector used for the radiation imaging in medical diagnostic imaging or non-destructive testing. The image pickup panel 901P of the radiation-image pickup apparatus 901 may be formed like a plate, and may have a size that corresponds to the size of an object whose image is to be captured.

The radiation-image pickup apparatus 901 includes the above-described image pickup panel 901P, a control portion 905 that controls the image pickup panel 901P, and a signal processing portion 906 that processes a signal outputted from the image pickup panel 901P. For example, the signal processing portion 906 performs AD conversion on a signal outputted from the image pickup panel 901P, and outputs the converted signal to the computer 904, as digital image data. In addition, the signal processing portion 906 may create a stop signal that stops the emission of the radiation from the radiation source 903, depending on a signal outputted from the image pickup panel 901P. The stop signal is sent to the irradiation control portion 902 via the computer 904; and the irradiation control portion 902 sends a stop command to the radiation source 903, in response to the stop signal.

The control portion 905 may be a PLD, such as an FPGA, an ASIC, a general-purpose computer that includes a program, or a combination in which part or all of the above-described components are included. The FPGA stands for a field programmable gate array. The PLD stands for a programmable logic device. The ASIC stands for an application specific integrated circuit.

The computer 904 controls the radiation-image pickup apparatus 901 and the irradiation control portion 902, and receives radiation image data from the radiation-image pickup apparatus 901 and displays the radiation image data, as a radiation image. In addition, the computer 904 functions as an input portion for a user to input a condition for capturing a radiation image.

As an example, the irradiation control portion 902 includes an irradiation switch. If the irradiation switch is turned on by a user, the irradiation control portion 902 sends an irradiation command to the radiation source 903, and sends a start notification, which indicates the start of emission of radiation, to the computer 904. The computer 904 receives the start notification; and notifies the control portion 905 of the radiation-image pickup apparatus 901, of the start of emission of radiation, in response to the start notification. In response to this, the control portion 905 causes the image pickup panel 901P to produce a signal that corresponds to the incident radiation.

Other Embodiments

In the above-described embodiments, the description has been made for the detector on which the energy rays for a detection target are incident from the surface 101 side of the semiconductor substrate 100. However, the present disclosure is not limited to this. The detector of the present disclosure may have a configuration in which the energy rays for a detection target are incident on the detector from a back side of the semiconductor substrate 100 opposite to the surface 101 side.

In addition, the radiation-image pickup system 900 described in the fifth embodiment is merely an example of the detection system that includes the detector. Thus, the detector that includes the structure described in the present disclosure may be applied to a detection system for another use. Examples of such a detection system include a radiation diagnostic apparatus for seeing through a patient's body by using X rays, an analytical apparatus for analyzing a sample by using X rays, and an electron microscope for capturing an image of a sample by using electron beam. However, the detection system is not limited to these.

In the first to the fourth embodiments, the description has been made for the pixel that includes a transfer transistor. However, the present disclosure is not limited to the pixel. For example, the transfer transistor may not be disposed in the pixel.

In the above, the description has been made for the plurality of embodiments. Each of the embodiments may be combined appropriately with another.

The present disclosure can increase the reading speed of the signal transmitted through each of the plurality of signal wirings disposed adjacent to each other.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-074419, filed Apr. 28, 2023, which is hereby incorporated by reference herein in its entirety.

What is claimed is:

1. A detector comprising:
a plurality of first pixels arranged in a column direction;
a signal wiring group disposed in a first wiring layer and including a plurality of signal wirings which are adjacent to each other, and to which signals are respectively outputted from the plurality of first pixels;
a first wiring disposed in the first wiring layer and adjacent to the signal wiring group; and
a control portion configured to control potential of the first wiring such that the potential of the first wiring follows potential of a signal transmitted through the signal wiring group.

2. The detector according to claim 1, wherein each of the plurality of first pixels includes
a first conversion portion configured to convert incident energy rays to electric charge,
a first floating diffusion configured to hold electric charge transferred from the first conversion portion,
a first reset transistor configured to reset potential of the first floating diffusion, and
a first amplification transistor configured to output a signal to a corresponding signal wiring of the plurality of signal wirings, the signal being based on the potential of the first floating diffusion,
wherein each of the plurality of first pixels is configured to
output, in a first period, a signal that represents a first potential to a corresponding signal wiring of the plurality of signal wirings, the first potential being based on a reset operation of the first reset transistor, and
output, in a second period, a signal that represents a second potential to the corresponding signal wiring of the plurality of signal wirings, the second potential being based on electric charge from the first conversion portion, and
wherein the control portion is configured to control, in the first period, the first wiring at a third potential, and control, in the second period, the first wiring at a fourth potential different from the third potential, wherein a polarity of the fourth potential with respect to the third potential is a same as a polarity of the second potential with respect to the first potential.

3. The detector according to claim 2, wherein each of the third potential and the fourth potential is a fixed potential.

4. The detector according to claim 1, wherein the control portion includes a voltage source configured to adjust potential outputted to the first wiring.

5. The detector according to claim 1, wherein the control portion includes a circuit configured to output a signal from a signal wiring included in the signal wiring group, to the first wiring.

6. The detector according to claim 1, wherein the control portion includes a second pixel configured to output a signal to the first wiring in synchronization with the plurality of first pixels.

7. The detector according to claim 6, wherein the second pixel is not used in generation of pixel data.

8. The detector according to claim 6, wherein the second pixel includes a second conversion portion configured to convert incident energy rays to electric charge, a second floating diffusion configured to hold electric charge transferred from the second conversion portion, a second reset transistor configured to reset potential of the second floating diffusion, and a second amplification transistor configured to output a signal to the first wiring, the signal being based on the potential of the second floating diffusion.

9. The detector according to claim 6, wherein the second pixel includes a current source, a second floating diffusion configured to hold electric charge transferred from the current source, a second reset transistor configured to reset potential of the second floating diffusion, and a second amplification transistor configured to output a signal to the first wiring, the signal being based on the potential of the second floating diffusion.

10. The detector according to claim 6, wherein the second pixel includes a second amplification transistor configured to output a potential applied by a voltage source, to the first wiring.

11. The detector according to claim 1, further comprising:

a second wiring disposed in the first wiring layer and set at a power supply potential or a ground potential, wherein the first wiring is disposed between the signal wiring group and the second wiring.

12. The detector according to claim 1, wherein the plurality of first pixels is formed in a main surface of a semiconductor layer, and wherein the first wiring layer is disposed on the main surface side.

13. The detector according to claim 12, wherein when seen through the detector in a direction orthogonal to the main surface, the control portion is disposed at a position at which the control portion does not overlap with the plurality of first pixels.

14. A detection system comprising:

an irradiation portion configured to emit energy rays to a target; and the detector according to claim 1, wherein the detector is configured to detect energy rays that travel from the target toward the detector.

* * * * *